(12) United States Patent
Chung et al.

(10) Patent No.: US 12,385,523 B2
(45) Date of Patent: Aug. 12, 2025

(54) ROTARY BEARING ASSEMBLY

(71) Applicant: Delta Electronics, Inc., Taoyuan (TW)

(72) Inventors: Chi-Wen Chung, Taoyuan (TW);
Hung-Wei Lin, Taoyuan (TW);
Hsien-Lung Tsai, Taoyuan (TW);
Wei-Ying Chu, Taoyuan (TW);
Chin-Hsiang Chen, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 162 days.

(21) Appl. No.: 18/231,627

(22) Filed: Aug. 8, 2023

(65) Prior Publication Data
US 2024/0159269 A1 May 16, 2024

Related U.S. Application Data

(60) Provisional application No. 63/424,395, filed on Nov. 10, 2022.

(30) Foreign Application Priority Data

Jun. 15, 2023 (CN) .......................... 202310712192.8

(51) Int. Cl.
*F16C 19/38* (2006.01)
*F16C 3/18* (2006.01)
(Continued)

(52) U.S. Cl.
CPC ................ *F16C 19/38* (2013.01); *F16C 3/18* (2013.01); *F16C 33/581* (2013.01); *F16H 1/32* (2013.01);
(Continued)

(58) Field of Classification Search
CPC .......... F16C 3/18; F16C 19/38; F16C 33/581; F16C 2361/61; F16H 1/32;
(Continued)

(56) References Cited

U.S. PATENT DOCUMENTS

2017/0335944 A1* 11/2017 Nishimura ............ F16H 57/082
2018/0031079 A1* 2/2018 Yoshida ............ F16H 57/02004
(Continued)

FOREIGN PATENT DOCUMENTS

CN        101769373 A    7/2010
CN        202418243 U    9/2012
(Continued)

*Primary Examiner* — Phillip A Johnson
(74) *Attorney, Agent, or Firm* — KIRTON McCONKIE; Evan R. Witt

(57) ABSTRACT

A rotary bearing assembly includes an input shaft, an inner-ring component, an outer-ring component and a load element. The input shaft is configured to combine a rotating shaft of a motor to provide a power input. The inner-ring component includes a gear set, wherein the inner-ring component is sleeved on the input shaft through the gear set and driven by the input shaft. The outer-ring component is sleeved on the inner-ring component through a load element and engaged with the gear set, wherein when the gear set is driven by the input shaft to drive the inner-ring component, the gear set drives the outer-ring component, and the inner-ring component and the outer-ring component are rotated relatively, wherein one of the inner-ring component and the outer-ring component is served to provide a power output, and a rotational speed difference is between the power input and the power output.

19 Claims, 22 Drawing Sheets

(51) Int. Cl.
*F16C 33/58* (2006.01)
*F16H 1/32* (2006.01)
*F16H 57/08* (2006.01)

(52) U.S. Cl.
CPC .... *F16C 2361/61* (2013.01); *F16H 2057/085* (2013.01)

(58) Field of Classification Search
CPC ......... F16H 2001/323; F16H 2001/324; F16H 2001/325; F16H 2001/327; F16H 2057/085
See application file for complete search history.

(56) References Cited

U.S. PATENT DOCUMENTS

| | | | |
|---|---|---|---|
| 2019/0162281 A1* | 5/2019 | Nakamura | ................ B62D 5/04 |
| 2019/0285143 A1* | 9/2019 | Sasaki | ................... F16H 57/023 |
| 2019/0331199 A1* | 10/2019 | Cao | ........................... F16H 1/32 |
| 2022/0082156 A1 | 3/2022 | Makisumi | |
| 2022/0136587 A1 | 5/2022 | Chung et al. | |

FOREIGN PATENT DOCUMENTS

| | | | | |
|---|---|---|---|---|
| CN | 203516608 U | | 4/2014 | |
| CN | 104121334 A | | 10/2014 | |
| CN | 104565217 A | * | 4/2015 | ............. B25J 17/00 |
| CN | 109915547 A | | 6/2019 | |
| CN | 210106448 U | | 2/2020 | |
| CN | 111120518 A | | 5/2020 | |
| CN | 211175109 U | | 8/2020 | |
| CN | 111828550 A | * | 10/2020 | ............. B25J 9/102 |
| JP | H06-037646 U | | 5/1994 | |
| JP | H11-210843 A | | 8/1999 | |
| JP | 2006-200557 A | | 8/2006 | |
| JP | 2007-046730 A | | 2/2007 | |
| JP | 2008-089144 A | | 4/2008 | |
| JP | 2010-032000 A | | 2/2010 | |
| JP | 2021-067317 A | | 4/2021 | |
| JP | 2021179232 A | | 11/2021 | |
| TW | I404873 B | | 8/2013 | |
| TW | 201825803 A | | 7/2018 | |
| WO | WO-2013051422 A1 | * | 4/2013 | ............ F16C 19/361 |

* cited by examiner

ROTARY BEARING ASSEMBLY

CROSS-REFERENCE TO RELATED APPLICATION

This application claims the benefit of U.S. Provisional Application No. 63/424,395 filed on Nov. 10, 2022, and entitled "REDUCER AND BEARING STRUCTURE THEREOF". This application also claims priority to China Patent Application No. 202310712192.8, filed on Jun. 15, 2023. The entireties of the above-mentioned patent application are incorporated herein by reference for all purposes.

FIELD OF THE INVENTION

The present disclosure relates to a rotary bearing assembly, and more particularly to a rotary bearing assembly for providing the high load capacity and the high-speed ratio deceleration output, and having the advantage of small size.

BACKGROUND OF THE INVENTION

Generally, a conventional rotary bearing includes a bearing inner ring, a bearing outer ring and a load element disposed between the bearing inner ring and the bearing outer ring. Through the rolling of the load element, the bearing outer ring being fixed and the bearing inner ring being rotating, or the bearing outer ring being rotating and the bearing inner ring being fixed can be achieved for certain applications. In general automation applications, if a load is to be carried and a rotary motion is to be performed, a rotary bearing will be used.

On the other hand, the motor in automation applications operates at a high speed and a low torque, so it is difficult to use the motor to drive a large-sized load. For allowing the motor to drive a heavy object, a speed reducer is used for reducing the rotating speed of the motor, thereby increasing the torque. Therefore, the conventional rotary bearing is used in a combination of the motor and the reducer, and it is further combined with a gear set for torque output use. However, since the size of the rotary bearing varies as the size of the gear set mated therewith, it is unfeasible to use the same material in different applications. Therefore, when the rotary bearing is used with the gear set, a reserved space needs to be larger, which is unfavorable for miniaturization design.

In addition, there are several different designs of reducers for performance improvement. However, it is not easy to achieve the purposes of reducing the entire volume, reducing the number of parts and facilitating the assembly under the same load at the same time. For example, in a conventional reducer, there are a plurality of pins placed between the inner teeth and the outer teeth, and the bearing ring and the inner gear ring are designed separately, so as to facilitate the axial fixation of the pins and the convenience of assembly. However, when the bearing ring and the inner gear ring are designed separately, the number of parts is increased, and the processing cost and assembly cost are increased. Furthermore, when the number of design parts is increased, the space requirement is increased, and it is difficult to achieve the volume miniaturization.

In view of this, there is a need of providing a rotary bearing assembly for providing the high load capacity and the high-speed ratio deceleration output, and having the advantage of small size, so as to obviate the drawbacks encountered by the prior arts.

SUMMARY OF THE INVENTION

An object of the present disclosure is to provide a rotary bearing assembly for forming an integrated bearing structure with the high load capacity and the high-speed ratio deceleration output, and also having the advantage of small size.

Another object of the present disclosure is to provide a rotary bearing assembly. With the rotary bearing assembly combined with the reducer, it allows reducing the overall volume and the number of parts under the same load, facilitating to the assembly process, and solving the shortcomings of the conventional cycloidal reducer that are not conducive to miniaturization and cannot share bearing materials. On the other hand, the concentric end and the eccentric end of the transmission shaft used in the rotary bearing assembly have the same diameter. Consequently, it is not necessary to increase the diameter of the eccentric end, and the miniaturization of the cycloid speed reducer can be realized. In addition, since the concentric end and the eccentric end of the transmission shaft have the same diameter, the bearings disposed around the concentric end and the eccentric end of the transmission shaft respectively may be designed to be compatible with the same specification. In this way, the component cost is reduced. Moreover, the concentric end and the eccentric end of the transmission shaft are integrally formed as a one-piece structure. Consequently, the accuracy of the arrangement and alignment of the transmission shaft within the rotary bearing assembly is improved.

In accordance with an aspect of the present disclosure, a rotary bearing assembly is provided and includes an input shaft, an inner-ring component, an outer-ring component and a load element. The input shaft is configured to combine a rotating shaft of a motor to provide a power input. The inner-ring component includes a gear set, wherein the inner-ring component is sleeved on the input shaft through the gear set and driven by the input shaft. The outer-ring component is sleeved on the inner-ring component through a load element and engaged with the gear set, wherein when the gear set is driven by the input shaft to drive the inner-ring component, the gear set drives the outer-ring component, and the inner-ring component and the outer-ring component are rotated relatively, wherein one of the inner-ring component and the outer-ring component is served to provide a power output, and a rotational speed difference is between the power input and the power output.

BRIEF DESCRIPTION OF THE DRAWINGS

The Above Contents of the Present Disclosure Will Become More Readily Apparent to Those Ordinarily Skilled in the Art after Reviewing the Following Detailed Description and Accompanying Drawings, in which.

DETAILED DESCRIPTION OF THE PREFERRED EMBODIMENT

Figure 1:
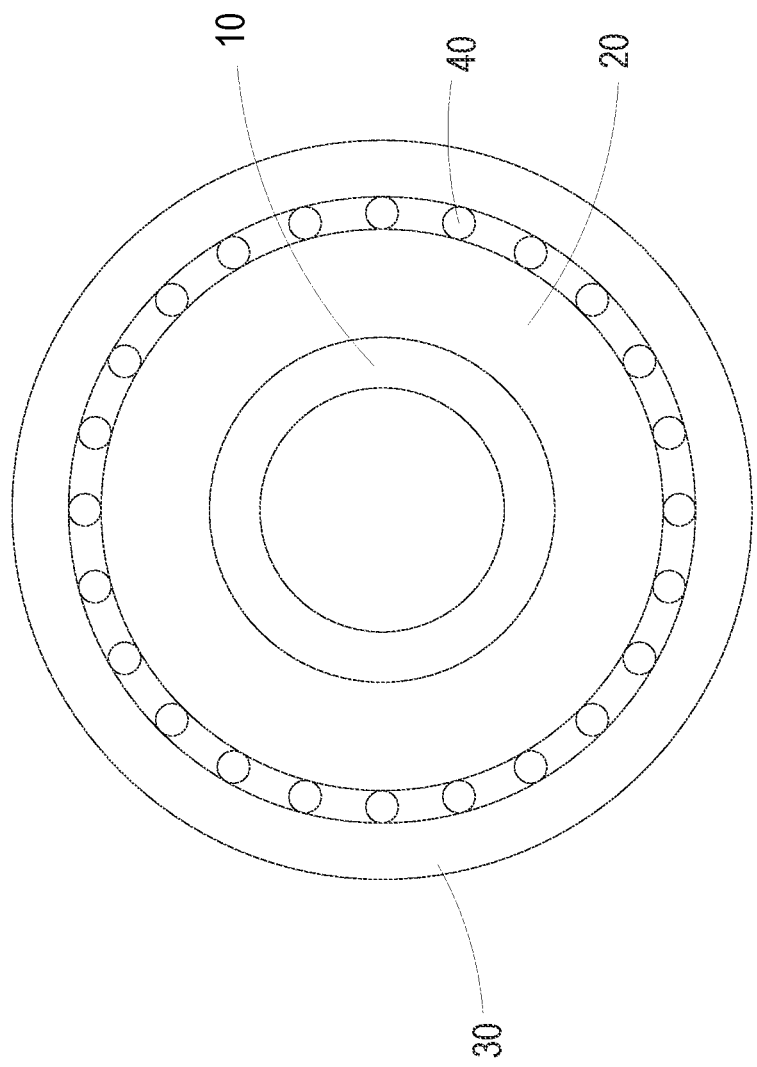
FIG. 1 is a schematic structural view illustrating a rotary bearing assembly according to a first embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "upper," "lower" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments.

Figure 2:
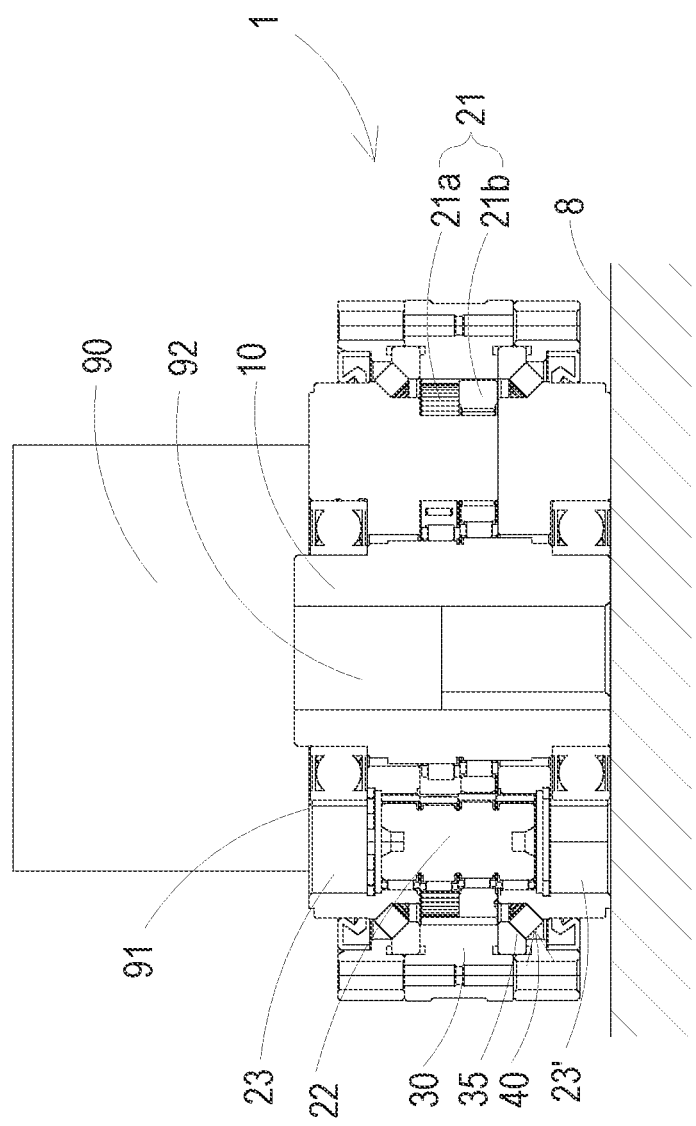
FIG. 2 is a vertically cross-sectional view illustrating the rotary bearing assembly combined with a motor according to the first embodiment of the present disclosure.

Please refer to FIG. 1 and FIG. 2. They illustrate a rotary bearing assembly according to a first embodiment of the present disclosure. Preferably but not exclusively, the rotary bearing assembly 1 is applied to various motor devices, machine tools, robotic arms, automobiles, motorcycles or other power machinery, so as to provide a power output with an appropriate speed difference.

In the embodiment, a rotary bearing assembly 1 is provided and includes an input shaft 10, an inner-ring component 20, an outer-ring component 30 and a load element 40. The input shaft 10 is located at a substantially central position of the rotary bearing assembly 1, and configured to combine a rotating shaft 92 of a motor 90 to provide a power input. The inner-ring component 20 includes a gear set 21. Preferably but not exclusively, the inner-ring component 20 is sleeved on the input shaft 10 through the gear set 21 and driven by the input shaft 10. The outer-ring component 30 is sleeved on the inner-ring component 20 through the load element 40 and engaged with the gear set 21. In the embodiment, when the gear set 21 is driven by the input shaft 10 to drive the inner-ring component 20, the gear set 21 drives the outer-ring component 30, and the inner-ring component 20 and the outer-ring component 30 are rotated relatively. In other words, one of the inner-ring component 20 and the outer-ring component 30 is served to provide a power output, and a rotational speed difference is between the power input and the power output.

In the embodiment, the outer-ring component 30 is served as an output end, and the inner-ring component 20 is served as an input end. The inner-ring component 20 further includes at least one output disc 23, 23' and a transmission shaft 22. Preferably but not exclusively, in the embodiment, the output disc 23 is fixed to an outer housing 91 of the motor 90, and the output disc 23' is fixed to a plane 8. In the embodiment, the at least one output disc 23, 23' is linked with the gear set 21 through the transmission shaft 22. When the gear set 21 is driven by the input shaft 10, the out-ring component 30 is driven through the gear set 21 to provide the power output.

Figure 3:
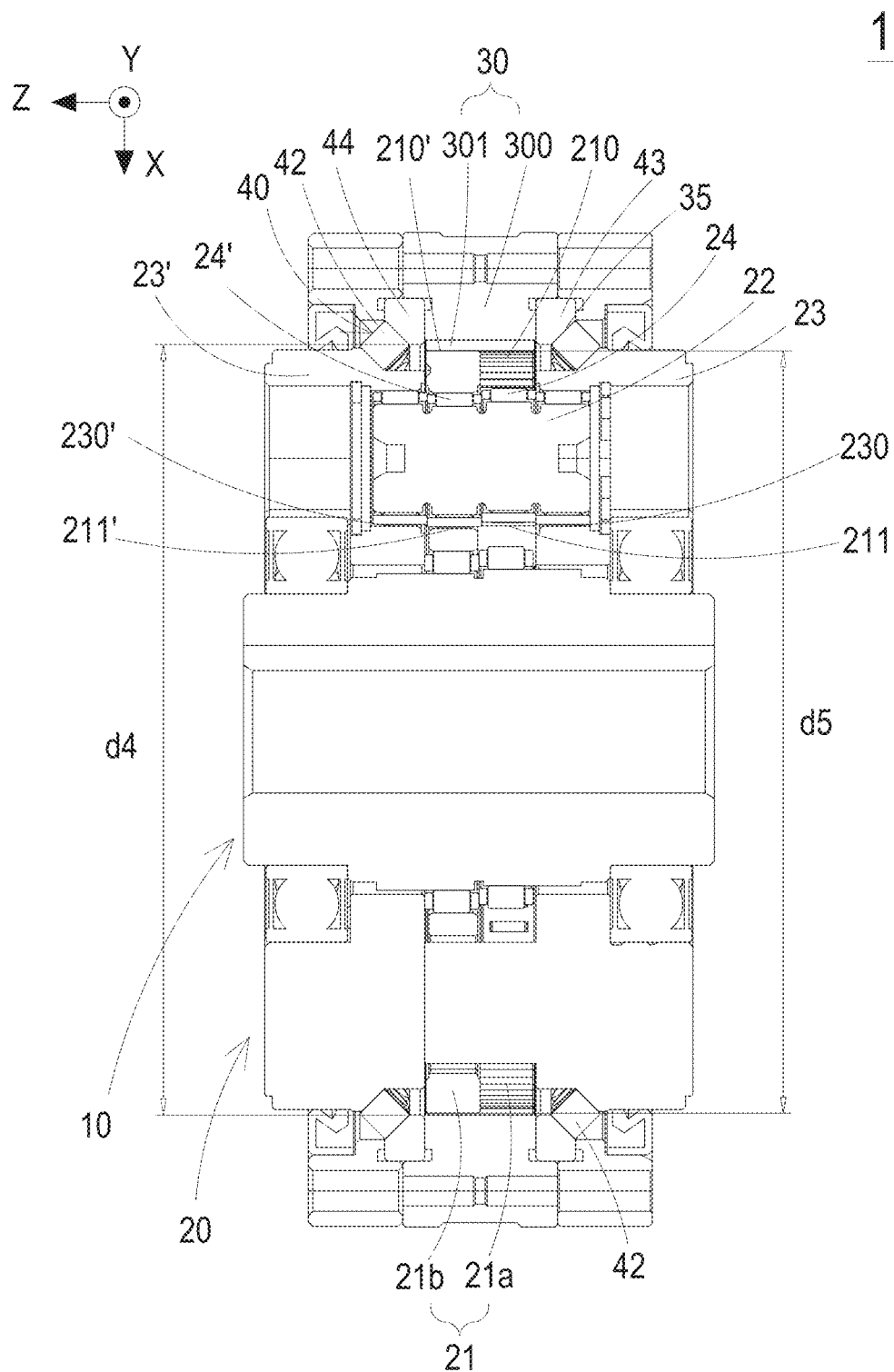
FIG. 3 is a vertically cross-sectional view illustrating the rotary bearing assembly according to the first embodiment of the present disclosure.

Please refer to FIG. 3 together. Preferably but not exclusively, in another embodiment, the outer-ring component 30 is served as a fixed end, and the inner-ring component 20 is served as an output end. The inner-ring component 20 includes at least one output disc 23, 23' and a transmission shaft 22. Preferably but not exclusively, in the embodiment, the at least one output disc 23, 23' is linked with the gear set 21 through the transmission shaft 22. When the gear set 21 is driven by the input shaft 10, the at last one output disc 23, 23' is driven through the transmission shaft 22 by the gear set 21 to provide the power output.

In the embodiment, the outer-ring component 30 includes a needle-housing ring 300 and a plurality of rolling pins 301. The plurality of rolling pins 301 are arranged on the needle-housing ring 300. The load element 40 includes a plurality of bearing rollers 42 and a pair of track rings 43, 44. The pair of track rings 43, 44 are disposed on two opposite sides of the needle-housing ring 300, so as to provide a running track respectively for the plurality of bearing rollers 42 running thereon. In the embodiment, there are two running tracks 35 arranged in pairs, but the present disclosure is not limited thereto.

In the embodiment, the gear set 21 includes a first cycloid disc 21a and a second cycloid disc 21b. Preferably but not exclusively, the first cycloid disc 21a is disposed around the input shaft 10 and driven by the input shaft 10 to rotate. The first cycloid disc 21a includes a first tooth part 210 contacted with at least corresponding one of the plurality of rolling pins 301. Preferably but not exclusively, the second cycloid disc 21b is disposed around the input shaft 10 and driven by the input shaft 10 to rotate. The second cycloid disc 21b includes a second tooth part 210' contacted with at least corresponding one of the rolling pins 301. In the embodiment, the first cycloid disc 21a and the second cycloid disc 21b are located at two opposite sides of the needle-housing ring 300. In the embodiment, the pair of track rings 43, 44 have a track inner diameter d4, the first cycloid disc 21a and the second cycloid disc 21b have a cycloid-disc outer diameter d5, and the track inner diameter d4 is greater than the cycloid-disc outer diameter d5.

In the embodiment, the at least one output disc 23, 23' includes a first output disc 23 and a second output disc 23'. Preferably but not exclusively, the first output disc 23 and the second output disc 23' are located at two opposite sides of the needle-housing ring 30. In that, the first cycloid disc 21a and the second cycloid disc 21b are located between the first output disc 23 and the second output disc 23'. Preferably but not exclusively, at least one of the first output disc 23 and the second output disc 23' is served as the output end of the rotary bearing assembly 1 to provide the power output. Certainly, in another embodiment, the needle-housing ring 300 is served as the output end, and at least one of the first output disc 23 and the second output disc 23' is served as the fixed end. The present disclosure is not limited thereto.

Figure 4:
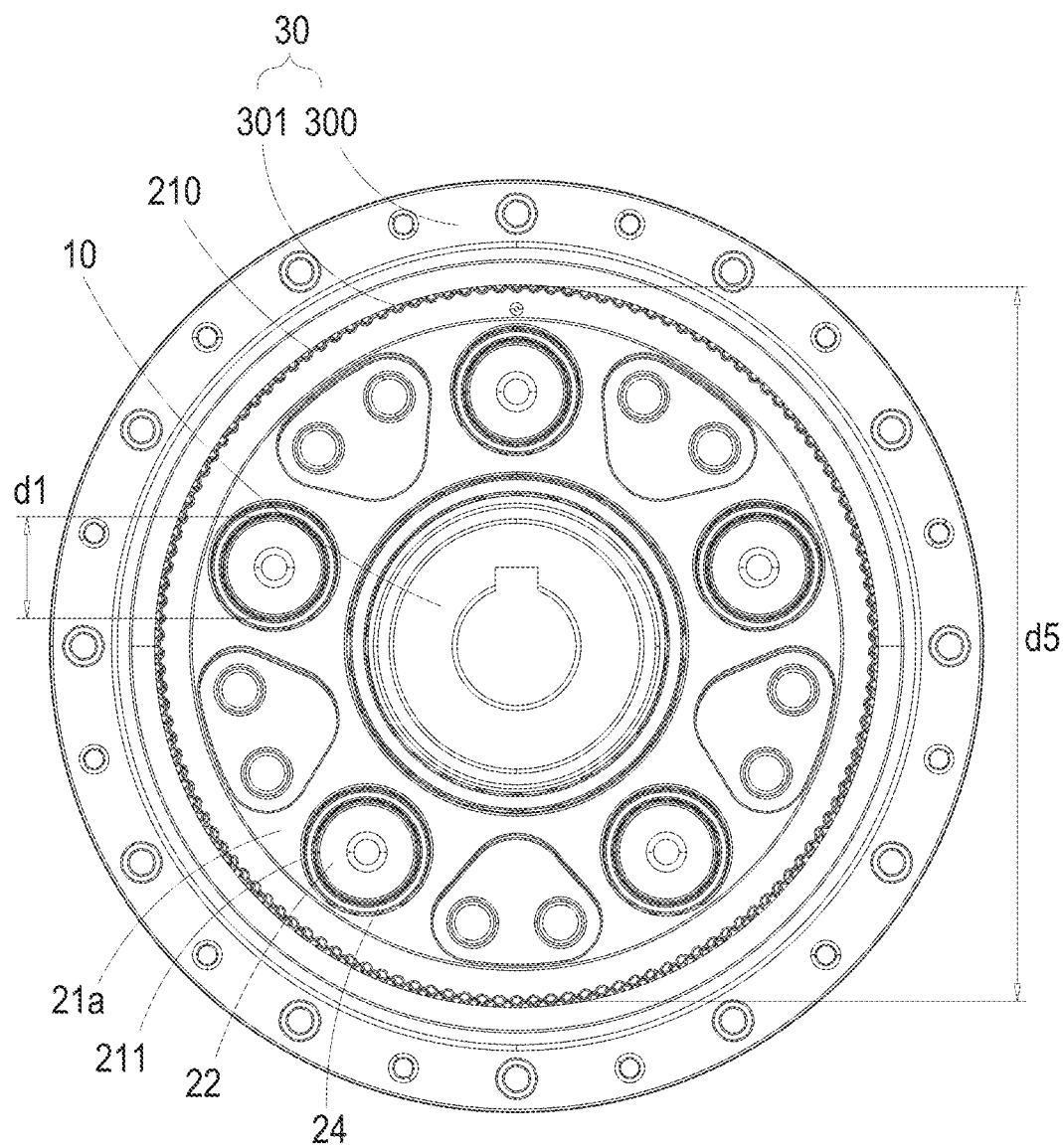
FIG. 4 is a horizontally cross-sectional view illustrating the rotary bearing assembly according to the first embodiment of the present disclosure.
Figure 5:
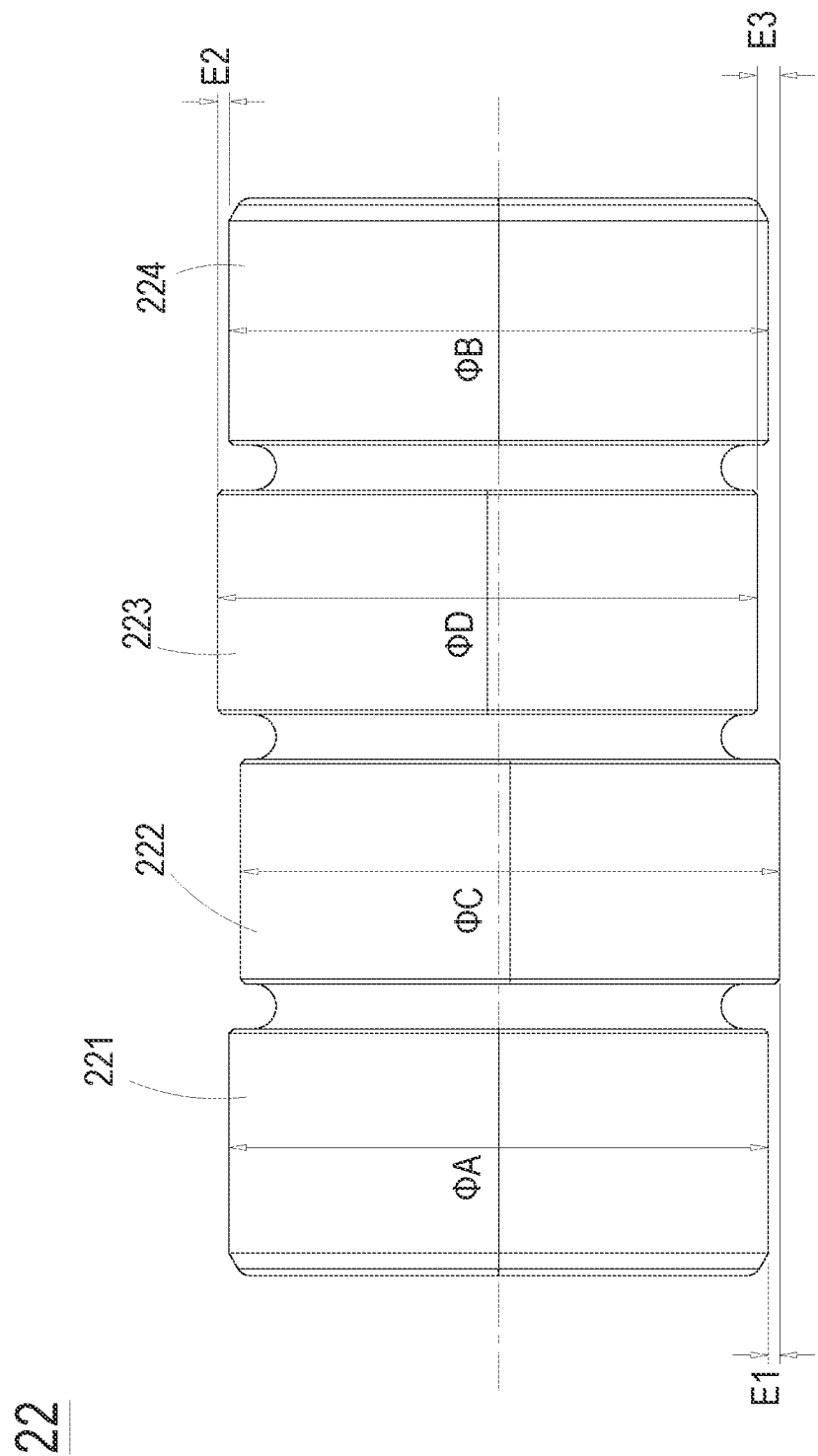
FIG. 5 is a lateral view illustrating the transmission shaft of the rotary bearing assembly according to the first embodiment of the present disclosure.

Please refer to FIG. 3, FIG. 4 and FIG. 5. In the embodiment, the number of the transmission shafts 22 may be one or more. Preferably but not exclusively, there are five transmission shafts 22. Each transmission shaft 22 is a crankshaft, and linked with the first cycloid disc 21a, the second cycloid disc 21b, the first output disc 23 and the second output disc 23'. Preferably but not exclusively, each transmission shaft 22 includes a first concentric end 221, a first eccentric end 222, a second eccentric end 223 and a second concentric end 224 integrally formed as a one-piece structure and arranged sequentially. The first concentric end 221 is linked with the first output disc 23, the first eccentric end 222 is linked with the first cycloid disc 21a, the second eccentric end 223 is linked with the second cycloid disc 21b, and the second concentric end 224 is linked with the second output disc 23'. Moreover, in the embodiment, an eccentricity value is between any neighboring two of the first concentric end 221, the first eccentric end 222, the second eccentric end 223 and the second concentric end 224, and a diameter ΦA of the first concentric end 221, a diameter ΦC of the first eccentric end 222, a diameter ΦD of the second eccentric end 223 and a diameter ΦB of the second concentric end 224 are all equal to a transmission-shaft diameter d1 of the transmission shaft 22.

From the above descriptions, instead of limiting the diameter of the eccentric end of the transmission shaft 22 to be greater than the diameter of the concentric end of the transmission shaft 22, the rotary bearing assembly 1 in the embodiment of the present disclosure allows the first concentric end 221, the first eccentric end 222, the second eccentric end 223 and the second concentric end 224 of the transmission shaft 22 to have the same diameter (i.e., ΦA=ΦC=ΦD=ΦB), which is equal to the transmission-shaft diameter d1. Consequently, it is not necessary to increase the diameter of the first eccentric end 222 and the diameter of the second eccentric end 223, and the miniaturization of the rotary bearing assembly 1 can be realized. As mentioned above, the first concentric end 221, the first eccentric end 222, the in second eccentric end 223 and the second concentric end 224 of the transmission shaft 22 have the same diameter. Consequently, when the bearings are disposed around the first concentric end 221, the first eccentric end 222, the second eccentric end 223 and the second concentric end 224 of the transmission shaft 22 respectively, these bearings may be designed to be compatible with the same specification. In this way, the component cost is reduced. Moreover, the first concentric end 221, the first eccentric end 222, the second eccentric end 223 and the second concentric end 224 of the transmission shaft 22 are integrally formed as a one-piece structure. Consequently, the accuracy of the arrangement and alignment of the transmission shaft 22 within the rotary bearing assembly 1 is improved.

In the embodiment, as shown in FIG. 5, the eccentricity value between the first concentric end 221 and the first eccentric end 222 is defined as a first eccentricity value E1. The eccentricity value between the second concentric end 224 and the second eccentric end 223 is defined as a second eccentricity value E2. The eccentricity value between the first eccentric end 222 and the second eccentric end 223 is defined as a third eccentricity value E3. The first eccentricity value E1 is equal to the second eccentricity value E2, and the third eccentricity value E3 is double the first eccentricity value E1. Accordingly, it is conducive to dispose the bearings around the first concentric end 221, the first eccentric end 222, the second eccentric end 223 and the second concentric end 224 of the transmission shaft 22, respectively. In addition, in the embodiment, the first concentric end 221 and the second concentric end 224 are coaxial with the transmission shaft 22. The first eccentric end 222 and the second eccentric end 223 are eccentrically disposed on the transmission shaft 22. The eccentric direction of the first eccentric end 222 is opposite to the eccentric direction of the second eccentric end 223.

Figure 6:
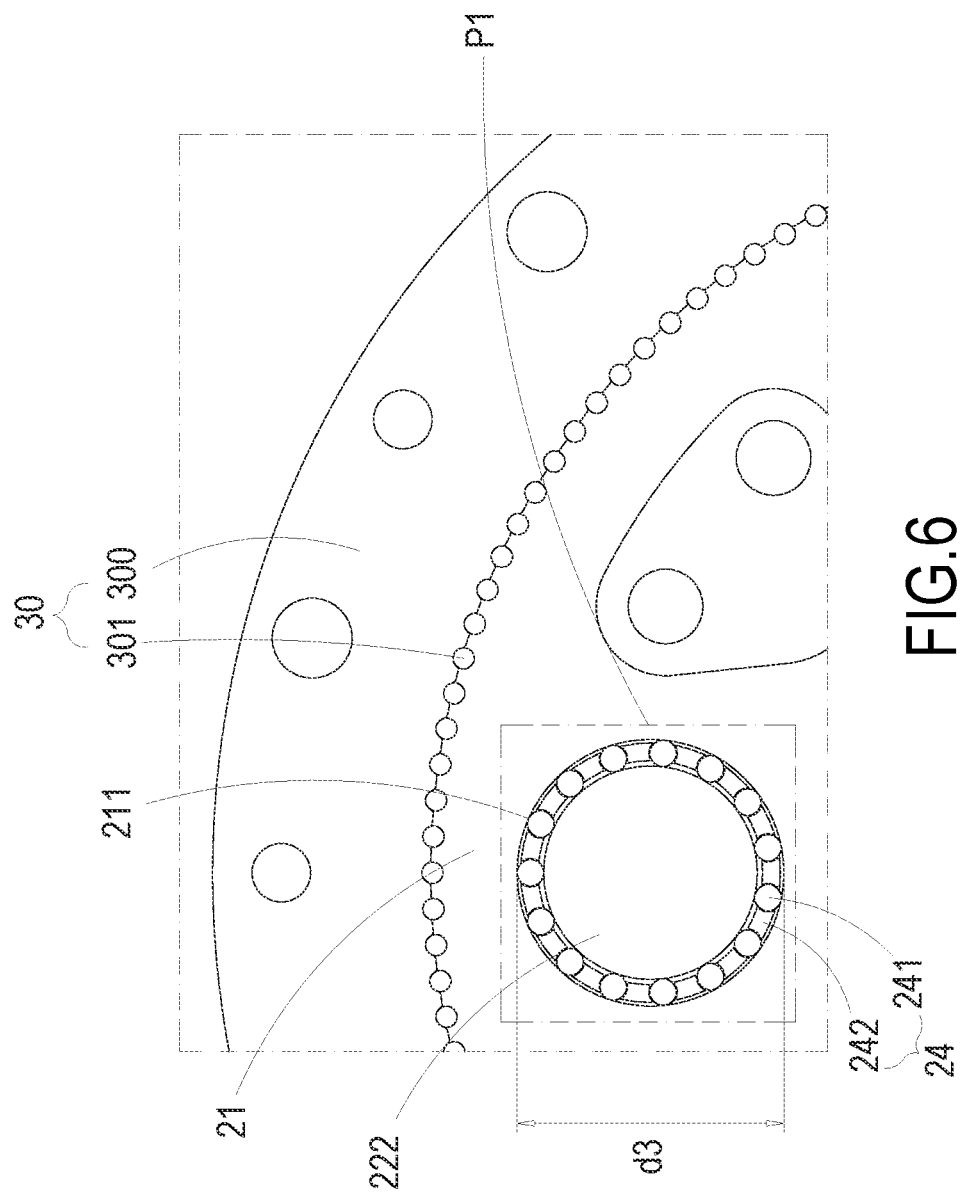
FIG. 6 is a horizontally cross-sectional view illustrating a part of the rotary bearing assembly according to the first embodiment of the present disclosure.

Please also refer to FIG. 6. In some embodiments, the first cycloid disc 21a further includes at least one installation hole 211. Each installation hole 221 is aligned with the corresponding transmission shaft 22 for allowing the first eccentric end 222 of the corresponding transmission shaft 22 to penetrate through. Consequently, the first eccentric end 222 of the corresponding transmission shaft 22 and the first cycloid disc 21a are linked with each other. In the embodiment, the first output disc 23 includes at least one installation hole 230. Each installation hole 230 is aligned with the corresponding transmission shaft 22 for allowing the first concentric end 221 of the corresponding transmission shaft 22 to penetrate through. Consequently, the first concentric end 221 of the corresponding transmission shaft 22 and the first output disc 23 are linked with each other. In the embodiment, the second cycloid disc 21b further includes at least one installation hole 211'. Each installation hole 211' is aligned with the corresponding transmission shaft 22 for allowing the second eccentric end 223 of the corresponding transmission shaft 22 to penetrate through. Consequently, the second eccentric end 223 of the corresponding transmission shaft 22 and the second cycloid disc 21b are linked with each other. In the embodiment, the second output disc 23' includes at least one installation hole 230'. Each installation hole 230' is aligned with the corresponding transmission shaft 22 for allowing the second concentric end 224 of the corresponding transmission shaft 22 to penetrate through. Consequently, the second concentric end 224 of the corresponding transmission shaft 22 and the second output disc 23' are linked with each other.

In addition, in the embodiment, the rotary bearing assembly 1 further includes a first bearing 24 and a second bearing 24'. The structure of the first bearing 24 and the structure of the second bearing 24' are the same. The first bearing 24 is disposed between the installation hole 211 of the first cycloid disc 21a and the first eccentric end 222. The second bearing 24' is disposed between the installation hole 211' of the second cycloid disc 21b and the second eccentric end 223. Moreover, each of the first bearing 24 and the second bearing 24' includes a plurality of output eccentric shaft needles 241. Since the first bearing 24 and the second bearing 24' have the same structure, only the output eccentric shaft needles 241 of the first bearing 24 are exemplified in FIG. 6. The plurality of output eccentric shaft needles 241 of the first bearing 24 are disposed around the main body of the first bearing 24. When the first bearing 24 is disposed between the installation hole 211 of the first cycloid disc 21a and the first eccentric end 222, the plurality of output eccentric shaft needles 241 of the first bearing 24 are disposed around the outer ring wall of the first eccentric end 222. Similarly, the plurality of output eccentric shaft needles 241 of the second bearing 24' are disposed around the main body of the second bearing 24'. When the second bearing 24' is disposed between the installation hole 211' of the second cycloid disc 21b and the second eccentric end 223, the plurality of output eccentric shaft needles 241 of the second bearing 24' are disposed around the outer ring wall of the second eccentric end 223. In addition, the transmission-shaft diameter d1 of the transmission shaft 22 is equal to the diameter ΦA of the first concentric end 221, the diameter ΦC of the first eccentric end 222, the diameter ΦD of the second eccentric end 223 and the diameter ΦB of the second concentric end 224 are d1 (i.e., ΦA=ΦC=ΦD=ΦB). Please further refer to FIG. 7. The diameter of each output eccentric shaft needle 241 is d2. The diameter of the installation hole 211 and the diameter of the installation hole 211' are both d3. The diameter d3 of the installation hole 211 and the installation hole 211' is equal to a sum of the diameter d1 of the first eccentric end 222 and double of the diameter d2 of the output eccentric shaft needle 2411 (i.e., d3=d1+2d2). Moreover, double of the diameter d2 of the output eccentric shaft needle 241 is greater than or equal to the first eccentricity value E1 (i.e., 2d≥E1).

Please refer to FIG. 3, FIG. 5, FIG. 7 and FIG. 8. In the embodiment, each of the first bearing 24 and the second bearing 24' further includes a plurality of rolling pin retainers 242, each adjacent two of the plurality of output eccentric shaft needles 241 are spaced by one rolling pin retainer 242, which is configured for covering and supporting the output eccentric shaft needle 241. In addition, a gap G is formed between each of the plurality of output eccentric shaft needles 241 and the adjacent corresponding rolling pin retainer 242 within the corresponding bearing. Therefore, under the circumstance that double of the diameter d2 of the output eccentric shaft needle 241 is greater than or equal to the first eccentricity value E1, the first bearing 24 and the second bearing 24' are ensured to be sleeved on the first eccentric end 222 and the second eccentric end 223, respectively. In addition, the link the first concentric end 221 and the first output disc 23, and the link between the second concentric end 224 and the second output disc 23' are implemented through the bearings, which are similar to the first bearing 24 and the second bearing 24' in structure and size. The present disclosure is not limited thereto, and not redundantly described herein.

Please refer to FIG. 1, FIG. 3 and FIG. 5. In the embodiment, the first cycloid disc 21a and the second cycloid disc 21b are disposed within the needle-housing ring 300. Furthermore, the at least one output disc 23, 23' of the inner-ring component 20 or the needle-housing ring 300 of the outer-ring component 30 can be driven to rotate by the first cycloid disc 21a and the second cycloid disc 21b. In an embodiment, the power transmission mode of the rotary bearing assembly 1 is described as the following. When the input shaft 10 is rotated, the first cycloidal disc 21a and the second cycloidal disc 21b are driven by the input shaft 10 to rotate. In addition, the first cycloidal disc 21a and the second cycloidal disc 21b linked with the first eccentric end 222 and the second eccentric end 223 of the transmission shaft 22, respectively, further drive the rotation of the transmission shaft 22. Consequently, the first concentric end 221 and the second concentric end 224 of the transmission shaft 22 are synchronously rotated and respectively drive the rotations of the first output disc 23 and the second output disc 23'. That is, the first output disc 23 and/or the second output disc 23' is served to provide the power output of the rotary bearing assembly 1. In an embodiment, the first output disc 23 and/or the second output disc 23' is fixed, and the needle-housing ring 300 is served to provide the power output of the rotary bearing assembly 1. The present disclosure is not limited thereto, and not redundantly described herein.

Figure 9:
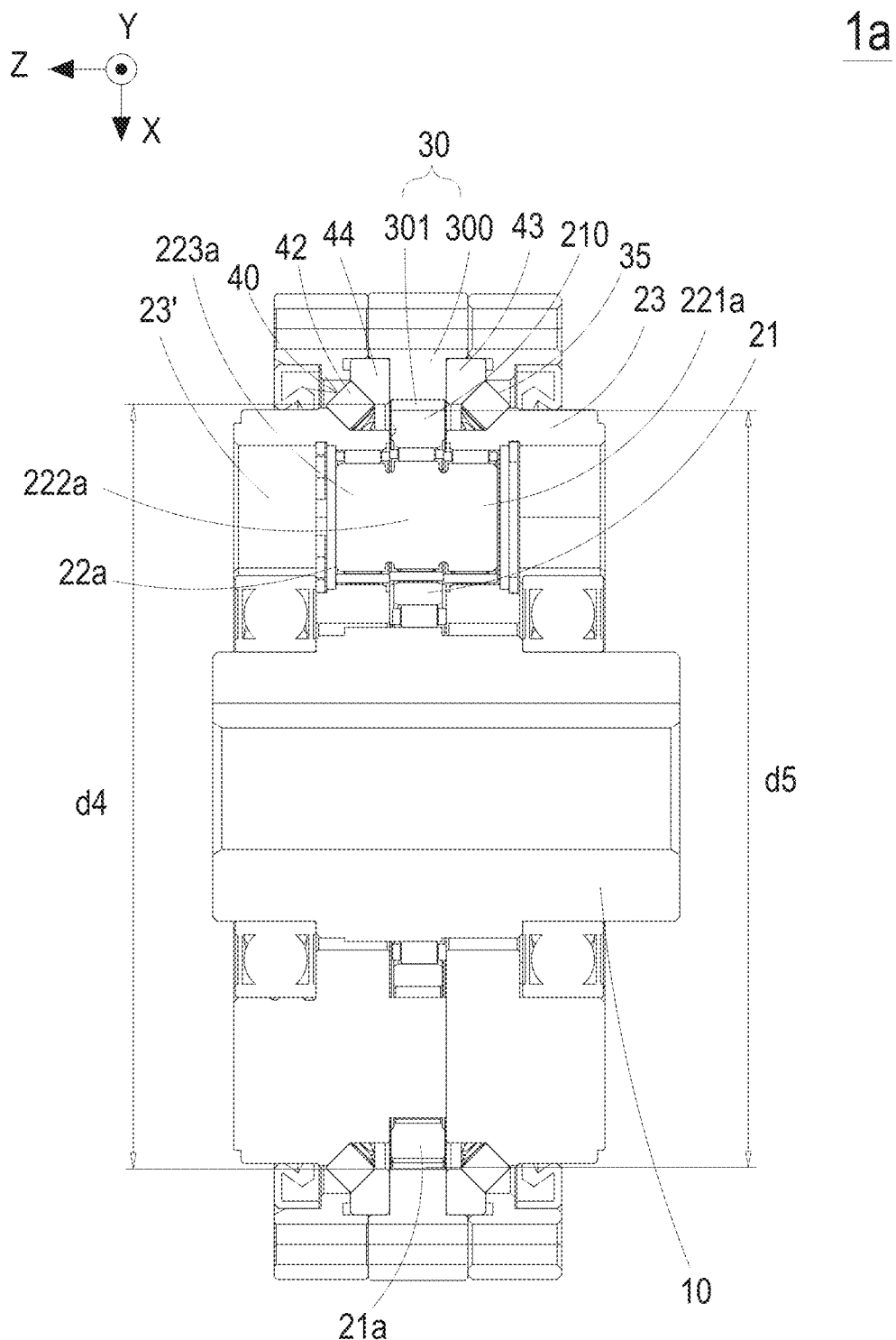
FIG. 9 is a vertically cross-sectional view illustrating a rotary bearing assembly according to a second embodiment of the present disclosure.
Figure 10:
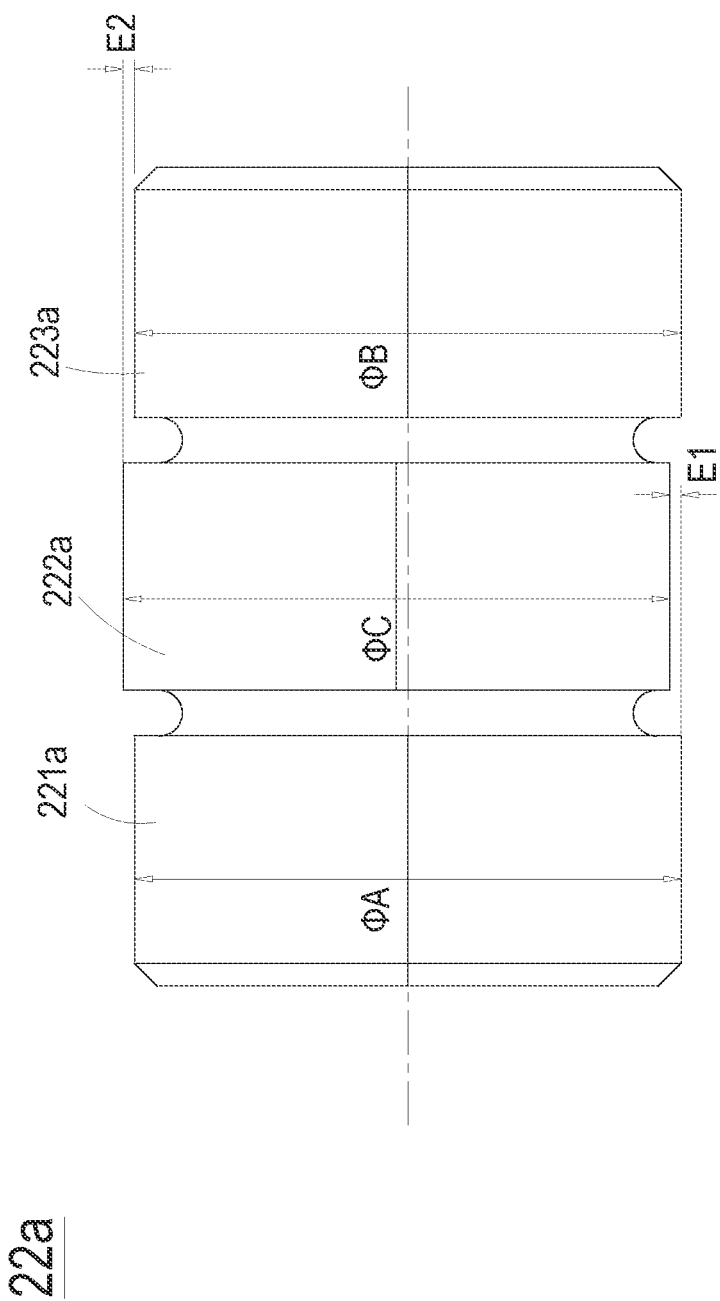
FIG. 10 is a lateral view illustrating the transmission shaft of the rotary bearing assembly according to the second embodiment of the present disclosure.
Figure 11:
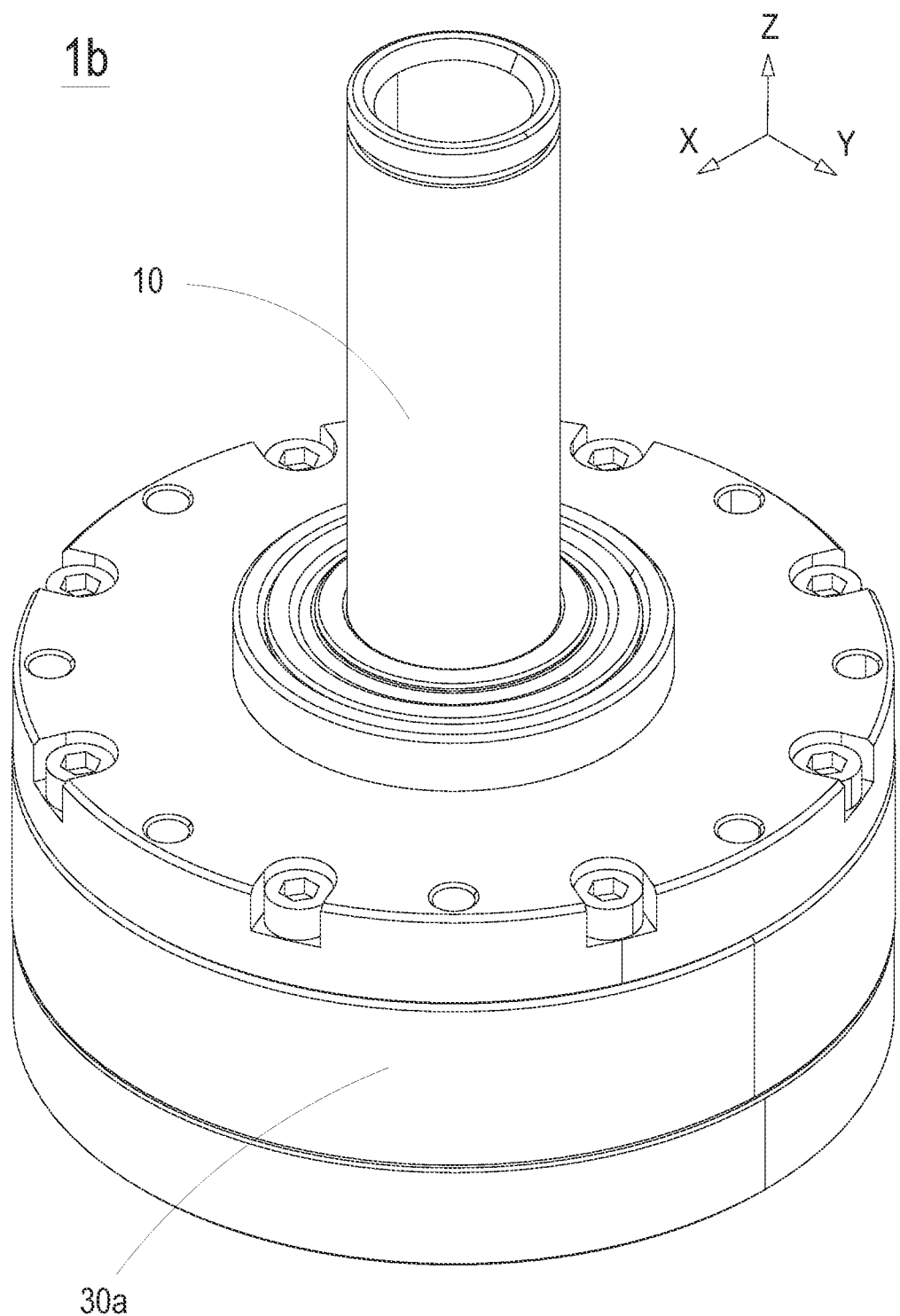
FIG. 11 is a schematic exterior view illustrating a rotary bearing assembly according to a third embodiment of the present disclosure.
Figure 12:
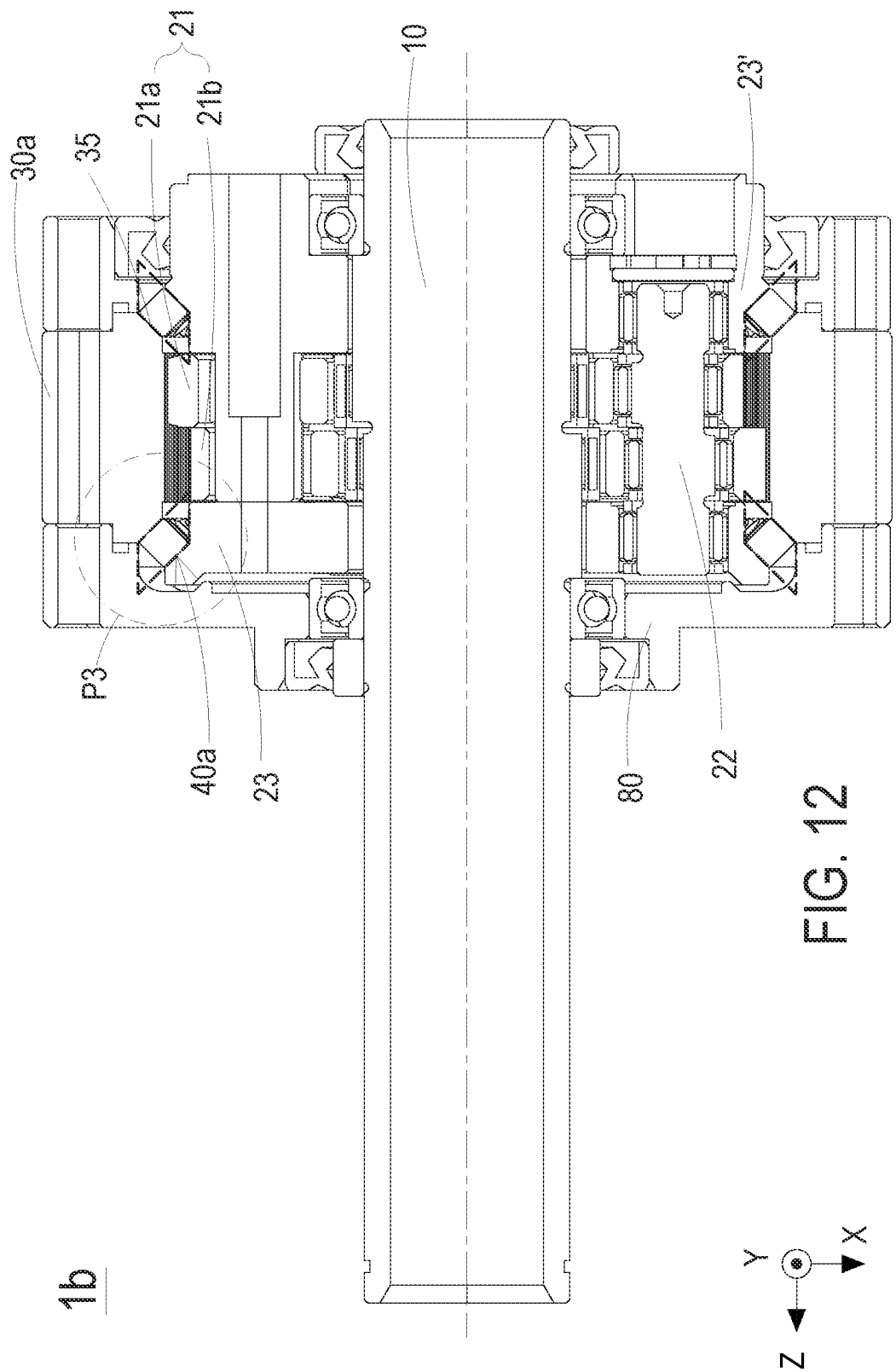
FIG. 12 is a vertically cross-sectional view illustrating the rotary bearing assembly according to the third embodiment of the present disclosure.
Figure 13:
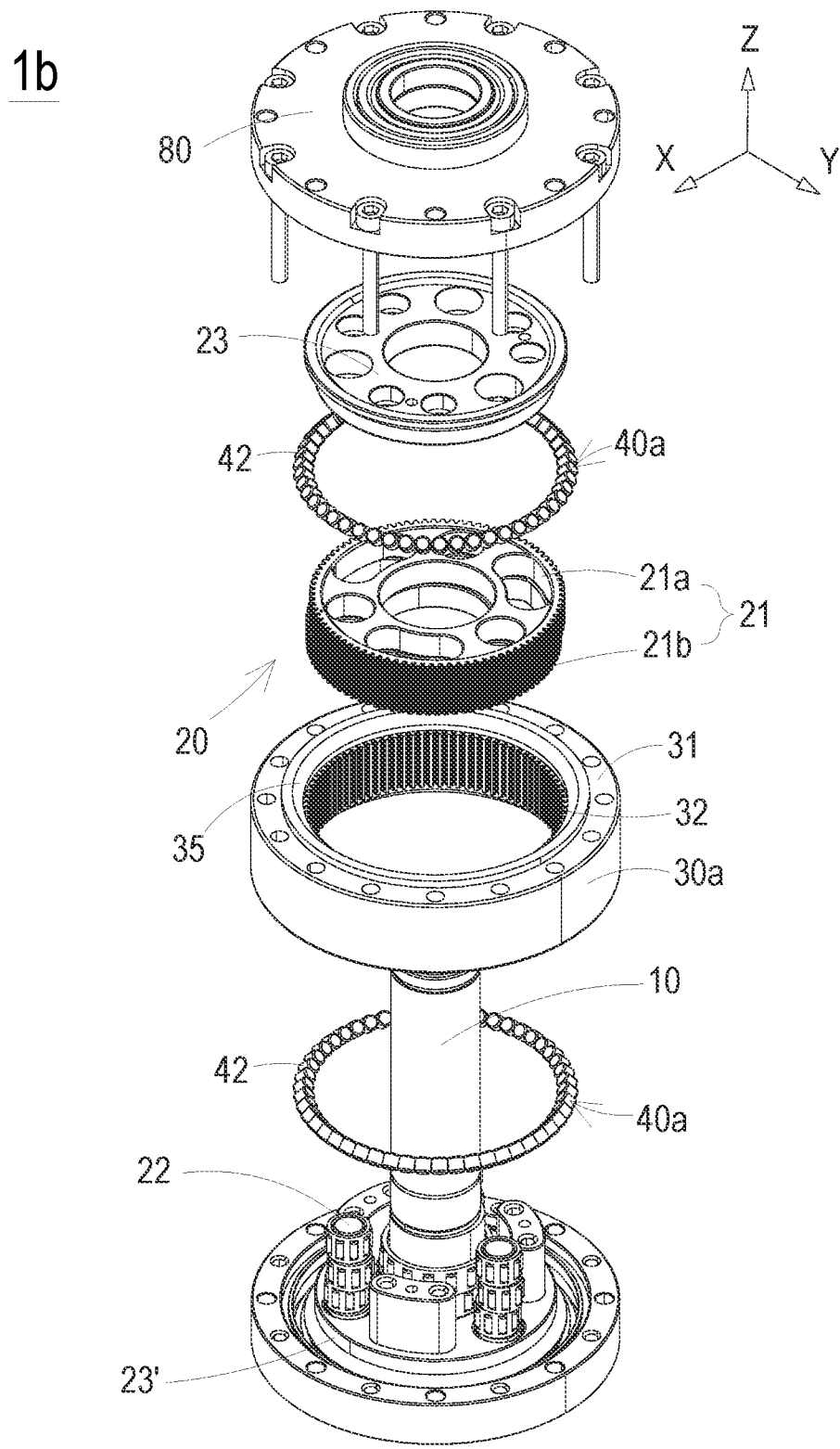
FIG. 13 is a schematic exploded view illustrating the rotary bearing assembly according to the third embodiment of the present disclosure.

Please refer to FIG. 1, FIG. 9 and FIG. 10. A rotary bearing assembly is provided according to a second embodiment of the present disclosure. In the embodiment, the structures, elements and functions of the rotary bearing assembly 1a are similar to those of the rotary bearing assembly 1 of FIG. 1 to FIG. 8, and are not redundantly described herein. Unlike the rotary bearing assembly 1 shown in FIG. 1 to FIG. 8 including two cycloid discs, the rotary bearing assembly 1a in this embodiment includes one single cycloid disc. That is, the rotary bearing assembly 1a includes a first cycloid disc 21a. The first cycloid disc 21a is disposed around the input shaft 10 and driven by the input shaft 10 to rotate, and the first cycloid disc 21a includes a first tooth part 210 contacted with at least corresponding one of the plurality of rolling pins 301. Preferably but not exclusively, a power input provided by a motor (not shown)

is received by the input shaft 10, and the input shaft 10 is driven by the power input 10 to rotate. The input shaft 10 is located at a substantially central position of the rotary bearing assembly 1a.

In the embodiment, the at least one output disc 23, 23' includes a first output disc 23 and a second output disc 23' as shown in FIG. 9. Preferably but not exclusively, the first output disc 23 and the second output disc 23' are located at two opposite sides of the needle-housing ring 30. In that, the first cycloid disc 21a is located between the first output disc 23 and the second output disc 23'. Preferably but not exclusively, at least one of the first output disc 23 and the second output disc 23' is served as the output end of the rotary bearing assembly 1a to provide the power output. Certainly, in another embodiment, the first output disc 23 and the second output disc 23' are served as a fixed end, and the outer-ring component 30 is served as the output end. The present disclosure is not limited thereto.

Figure 7:
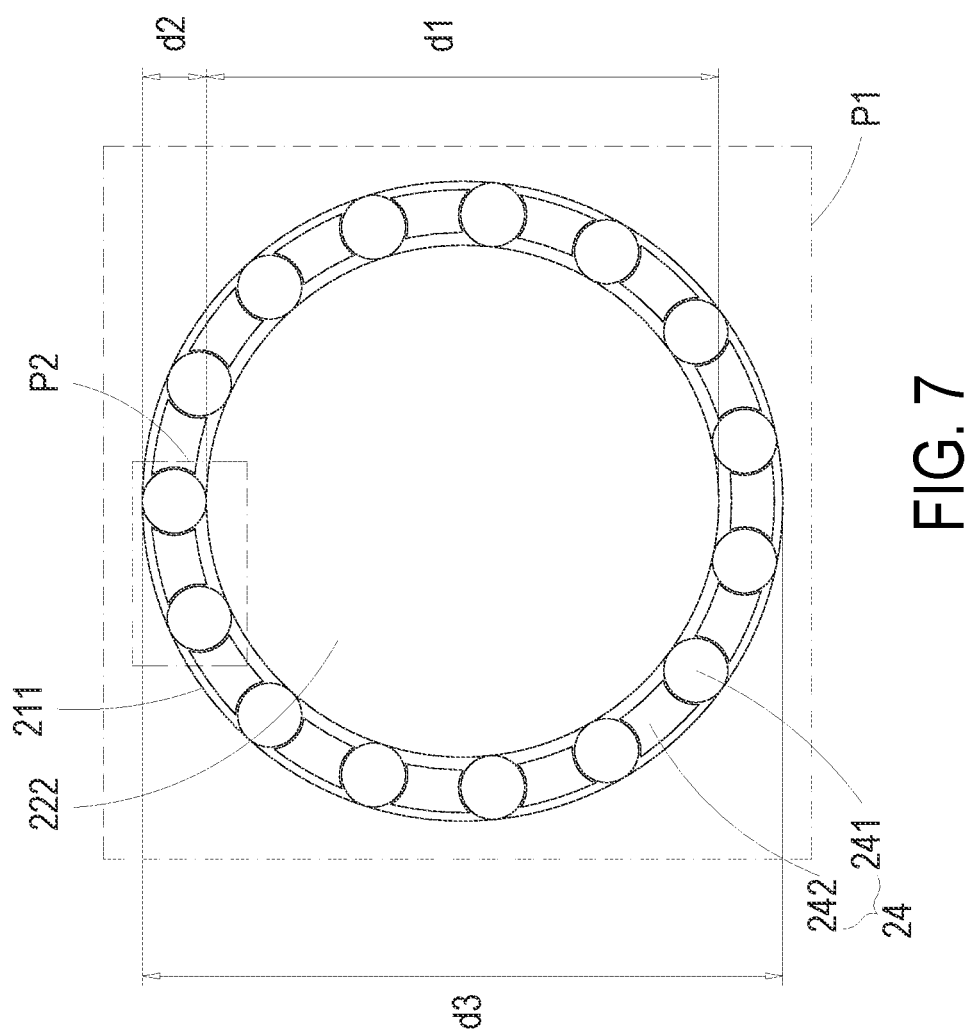
FIG. 7 is an enlarged view of region P1 in FIG. 6.
Figure 8:
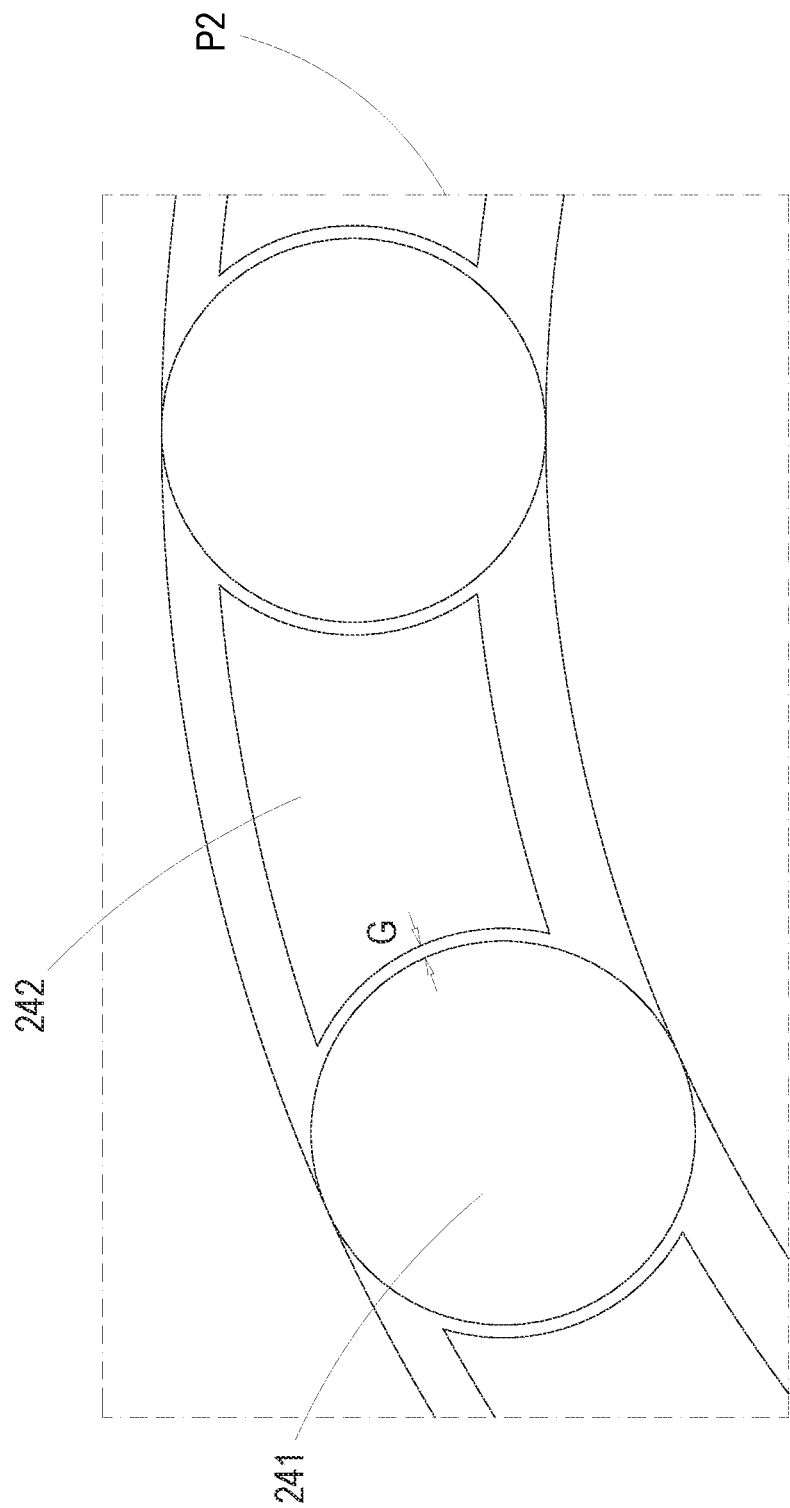
FIG. 8 is an enlarged view of region P2 in FIG. 7.

In the embodiment, the transmission shaft 22 is a crankshaft, and linked with the first cycloid disc 21a, the first output disc 23 and the second output disc 23'. Preferably but not exclusively, the transmission shaft 22a includes a first concentric end 221a, a first eccentric end 222a and a second concentric end 223a integrally formed as a one-piece structure and arranged sequentially. The first concentric end 221a is linked with the first output disc 23, the first eccentric end 222a is linked with the first cycloid disc 21a, and the second concentric end 223a is linked with the second output disc 23'. Moreover, in the embodiment, an eccentricity value is between any neighboring two of the first concentric end 221a, the first eccentric end 222a and the second concentric end 223a, and a diameter ΦA of the first concentric end 221a, a diameter 1C of the first eccentric end 222a and a diameter ΦB of the second concentric end 223a are all equal to a transmission-shaft diameter d1 (as shown in FIG. 7) of the transmission shaft 22a.

In the embodiment, instead of limiting the diameter of the eccentric end of the transmission shaft 22a to be greater than the diameter of the concentric end of the transmission shaft 22a, the rotary bearing assembly 1a in the embodiment of the present disclosure allows the first concentric end 221a, the first eccentric end 222a and the second concentric end 223a of the transmission shaft 22a to have the same diameter (i.e., ΦA=ΦC=ΦB), which is equal to the transmission-shaft diameter d1. Consequently, it is not necessary to increase the diameter of the first eccentric end 222a, and the miniaturization of the rotary bearing assembly 1a can be realized. As mentioned above, the first concentric end 221a, the first eccentric end 222a and the second concentric end 223a of the transmission shaft 22a have the same diameter. Consequently, when the bearings are disposed around the first concentric end 221a, the first eccentric end 222a and the second concentric end 223a of the transmission shaft 22a respectively, these bearings may be designed to be compatible with the same specification. In this way, the component cost is reduced. Moreover, the first concentric end 221a, the first eccentric end 222a and the second concentric end 223a of the transmission shaft 22a are integrally formed as a one-piece structure. Consequently, the accuracy of the arrangement and alignment of the transmission shaft 22a within the rotary bearing assembly 1a is improved.

In the embodiment, as shown in FIG. 10, the eccentricity value between the first concentric end 221a and the first eccentric end 222a is defined as a first eccentricity value E1. The eccentricity value between the second concentric end 223a and the first eccentric end 222a is defined as a second eccentricity value E2. The first eccentricity value E1 is equal to the second eccentricity value E2. Accordingly, it is conducive to dispose the bearings around the first concentric end 221a, the first eccentric end 222a and the second concentric end 223a of the transmission shaft 22a, respectively. In addition, in the embodiment, the first concentric end 221a and the second concentric end 223a are coaxial with the transmission shaft 22a. The first eccentric end 222a is eccentrically disposed on the transmission shaft 22a.

Similarly, in an embodiment, the power transmission mode of the rotary bearing assembly 1a is described as the following. When the input shaft 10 is rotated, the first cycloidal disc 21a is driven by the input shaft 10 to rotate. In addition, the first cycloidal disc 21a linked with the first eccentric end 222a of the transmission shaft 22a, respectively, further drives the rotation of the transmission shaft 22a. Consequently, the first concentric end 221a and the second concentric end 223a of the transmission shaft 22a are synchronously rotated and respectively drive the rotations of the first output disc 23 and the second output disc 23'. That is, the first output disc 23 and/or the second output disc 23' is served to provide the power output of the rotary bearing assembly 1a. In an embodiment, the first output disc 23 and/or the second output disc 23' is fixed, and the outer-ring component 30 is served to provide the power output of the rotary bearing assembly 1a. The present disclosure is not limited thereto, and not redundantly described herein.

Please refer to FIG. 11 to FIG. 18. A rotary bearing assembly is provided according to a third embodiment of the present disclosure. Please refer to FIGS. 11 to 13. In the embodiment, the structures, elements and functions of the rotary bearing assembly 1b are similar to those of the rotary bearing assembly 1 of FIG. 1 to FIG. 8, and are not redundantly described herein. In the embodiment, the load element 40a includes a plurality of bearing rollers 42. Preferably but not exclusively, the outer-ring component 30 is an inner gear ring, which includes an inner-gear-ring main body 31, an inner tooth portion 32 and at least one running track 35 for the plurality of bearing rollers 42 running thereon. In the embodiment, there are two running tracks arranged in pairs. Moreover, the running track 35 has an inclined angle relative to an axial direction of the input shaft 10. In the embodiment, the gear set 21 of the inner-ring component 20 and the inner tooth portion 32 of the inner gear ring are partially engaged with each other.

Figure 14:
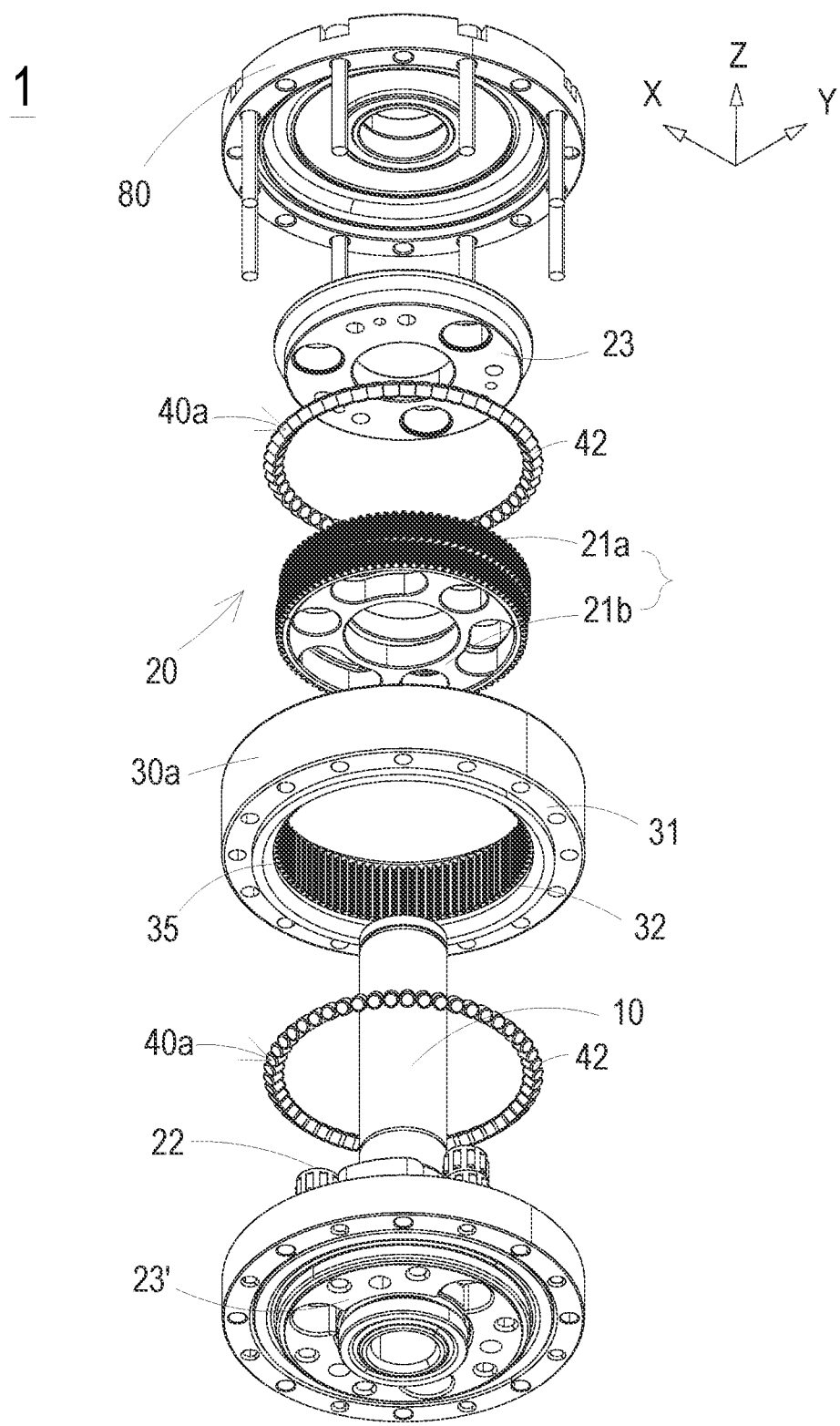
FIG. 14 is a schematic exploded view illustrating the rotary bearing assembly according to the third embodiment of the present disclosure and taken from another perspective.
Figure 15:
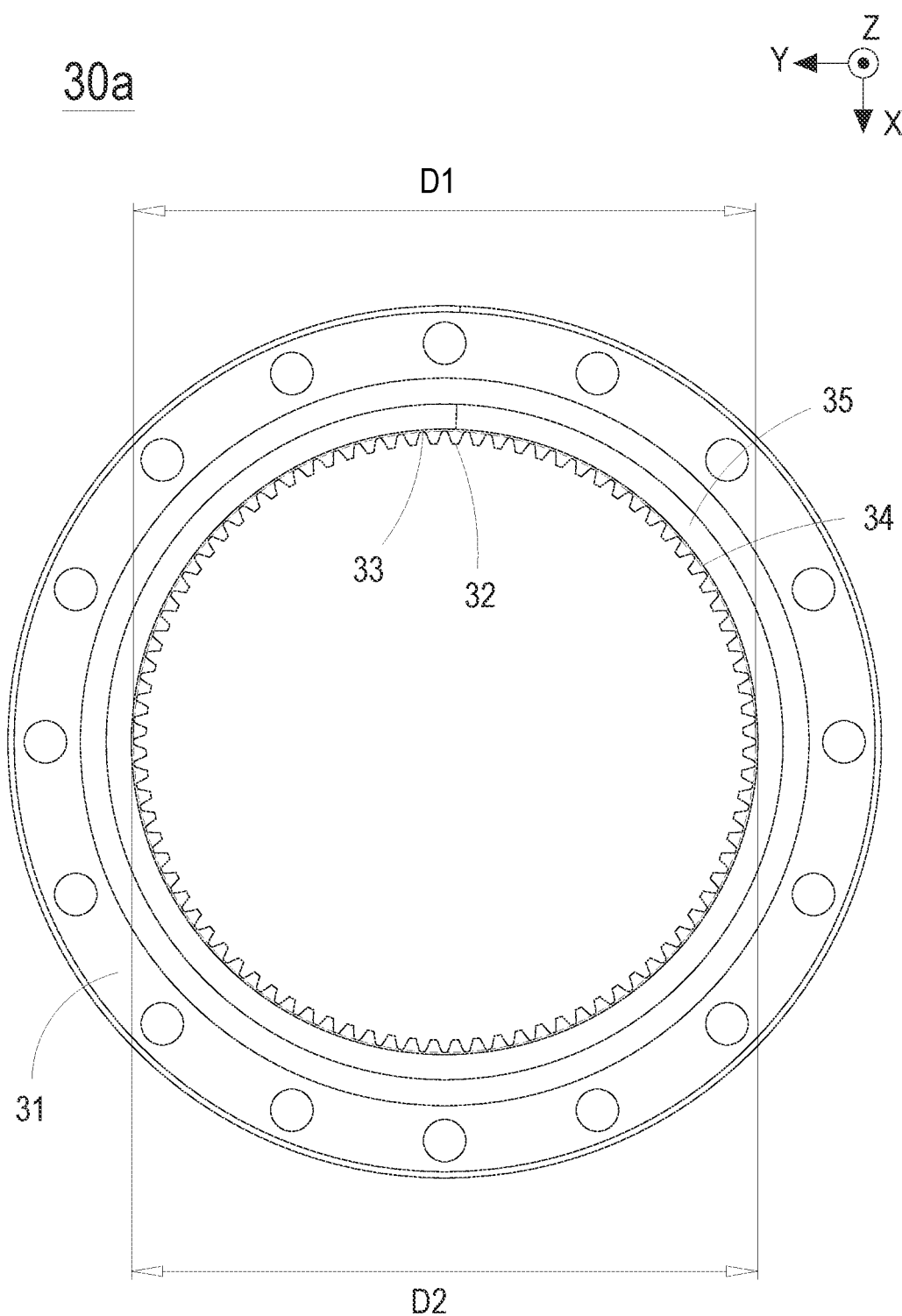
FIG. 15 is a top view illustrating the inner gear ring of the rotary bearing assembly according to the first embodiment of the present disclosure.
Figure 16:
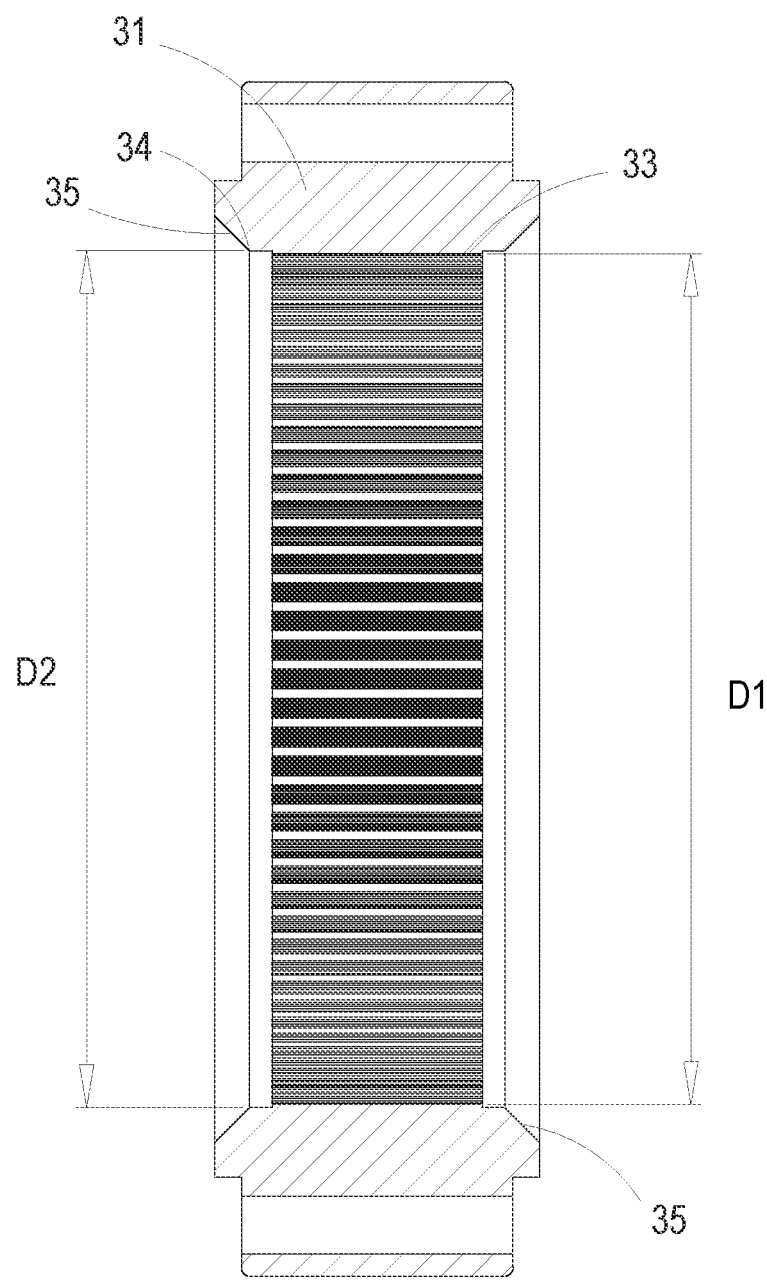
FIG. 16 is a vertically cross-sectional view illustrating the inner gear ring of the rotary bearing assembly according to the first embodiment of the present disclosure.
Figure 17:
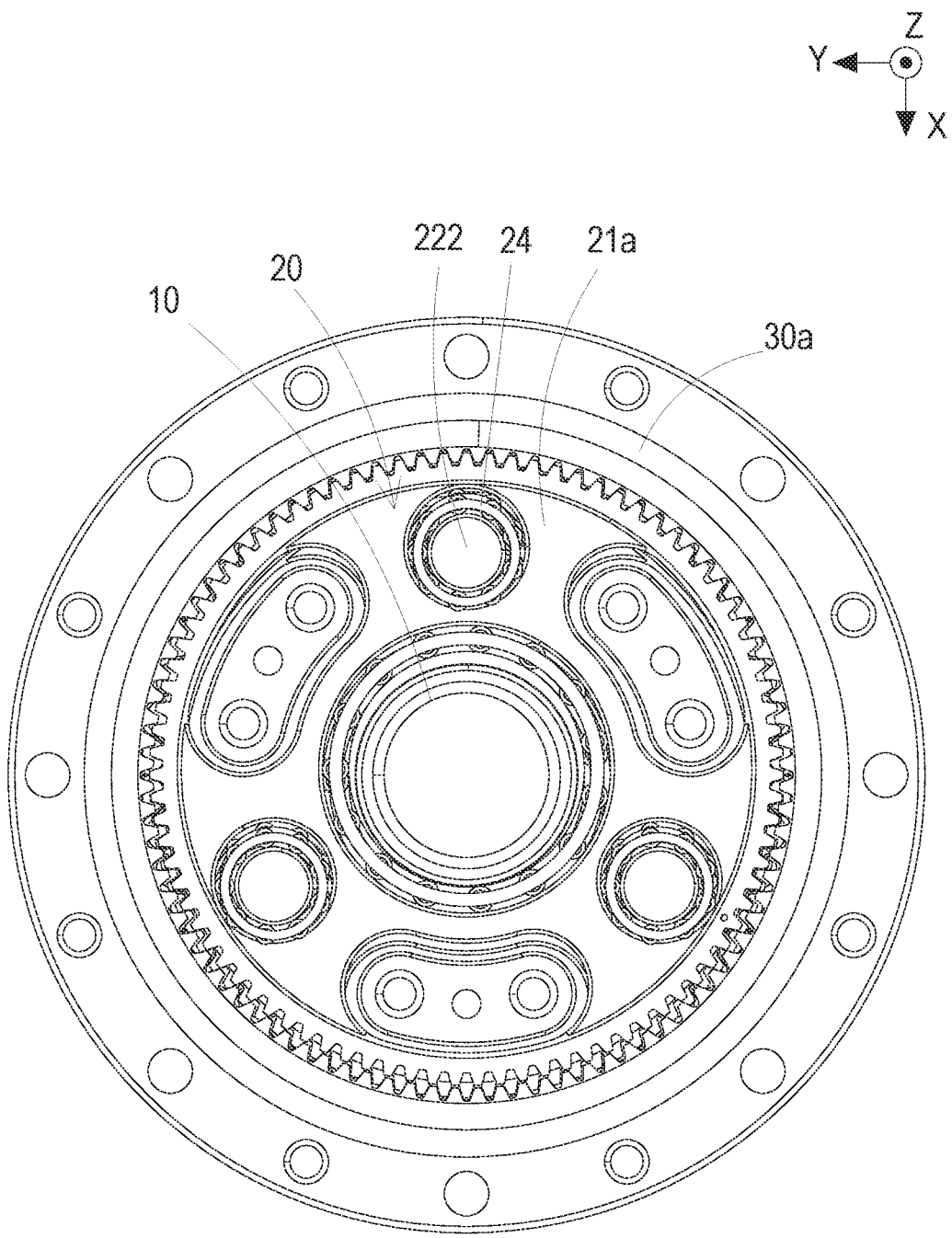
FIG. 17 is a horizontally cross-sectional view illustrating the rotary bearing assembly according to the third embodiment of the present disclosure.
Figure 18:
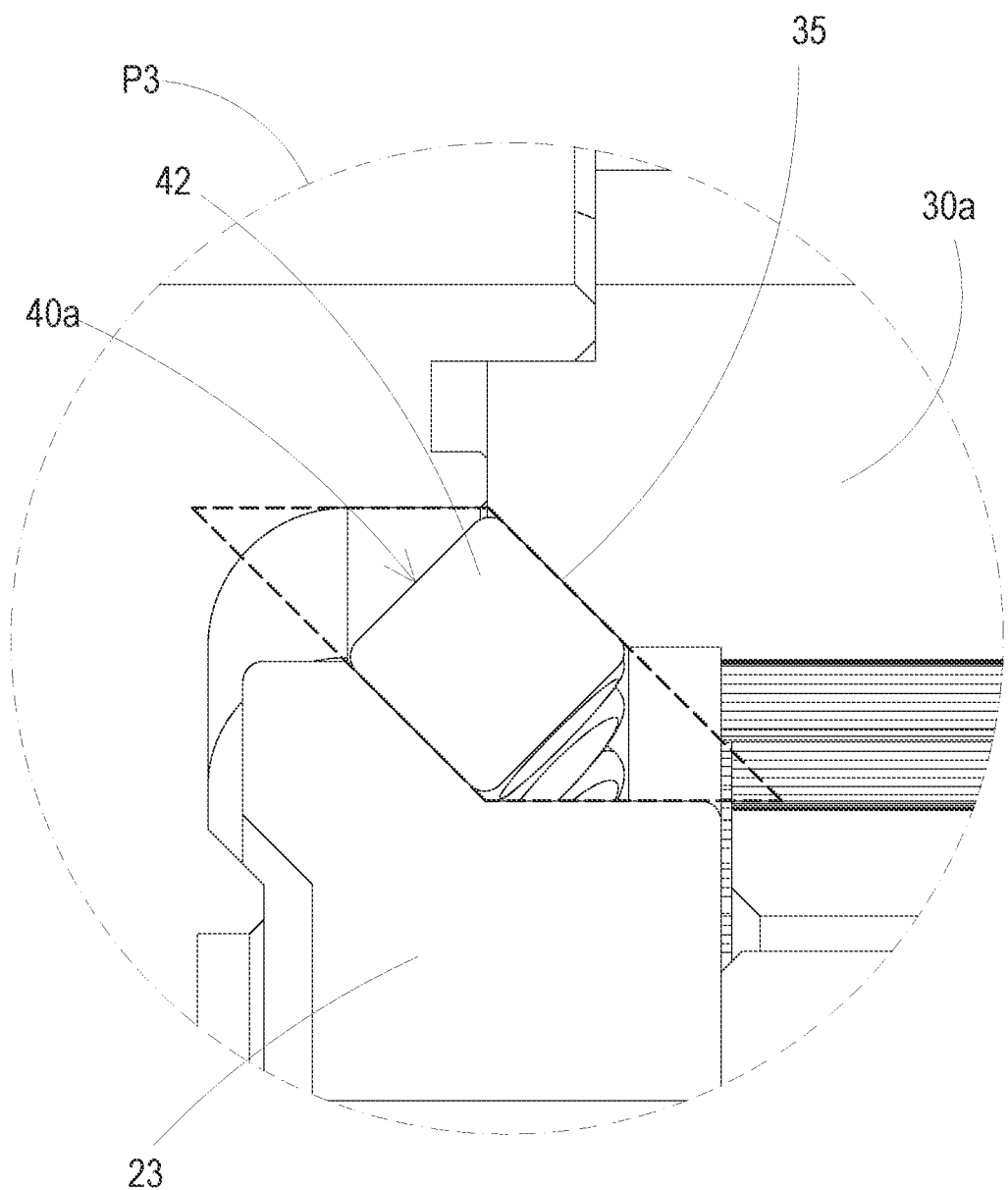
FIG. 18 is an enlarged view of region P3 in FIG. 12.

Please refer to FIG. 14 to FIG. 15. In the embodiment, the inner tooth portion 32 is set on an inner-base surface 33 of the inner-gear-ring main body 31 and has a gear-base diameter D1. The running track 35 is arranged on one lateral side of the inner gear ring has a track inner diameter D2 in the innermost circle 34 adjacent to the inner tooth portion 32. Preferably but not exclusively, the track inner diameter D2 is greater than or equal to the gear-base diameter D1. In the embodiment, the running track 35 is spatially corresponding to the inner-gear-ring main body 31 and the at least one output disc 23' of the inner-ring component 20, and a parallelogram is collaboratively formed on a radial section so that the plurality of bearing rollers 42 are configured to run between the inner-gear-ring main body 31 and the at least one output disc 23' of the inner-ring component 20.

Please refer to FIG. 14 to FIG. 17. In the embodiment, when the input shaft 10 is rotated, the first cycloidal disc 21a and the second cycloidal disc 21b are driven by the input shaft 10 to rotate. In addition, the first cycloidal disc 21a and the second cycloidal disc 21b linked with the transmission shaft 22 further drive the rotation of the transmission shaft 22. Consequently, the first output disc 23 and the second output disc 23' are driven through the transmission shaft 22 to rotate. In the embodiment, the first output disc 23 and/or the second output disc 23' is served to provide the power output of the rotary bearing assembly 1b. Preferably but not exclusively, the second output disc 23' is served to provide the power output, and the outside of the first output disc 23 is covered with a fixed housing 80. The fixed housing 80 is combined with the outer-ring component 30a and served as a fixed end. Certainly, in another embodiment, the first output disc 23 and/or the second output disc 23' is fixed, and the outer-ring component 30a is served to provide the power output of the rotary bearing assembly 1b. The present disclosure is not limited thereto, and not redundantly described herein.

Figure 19:
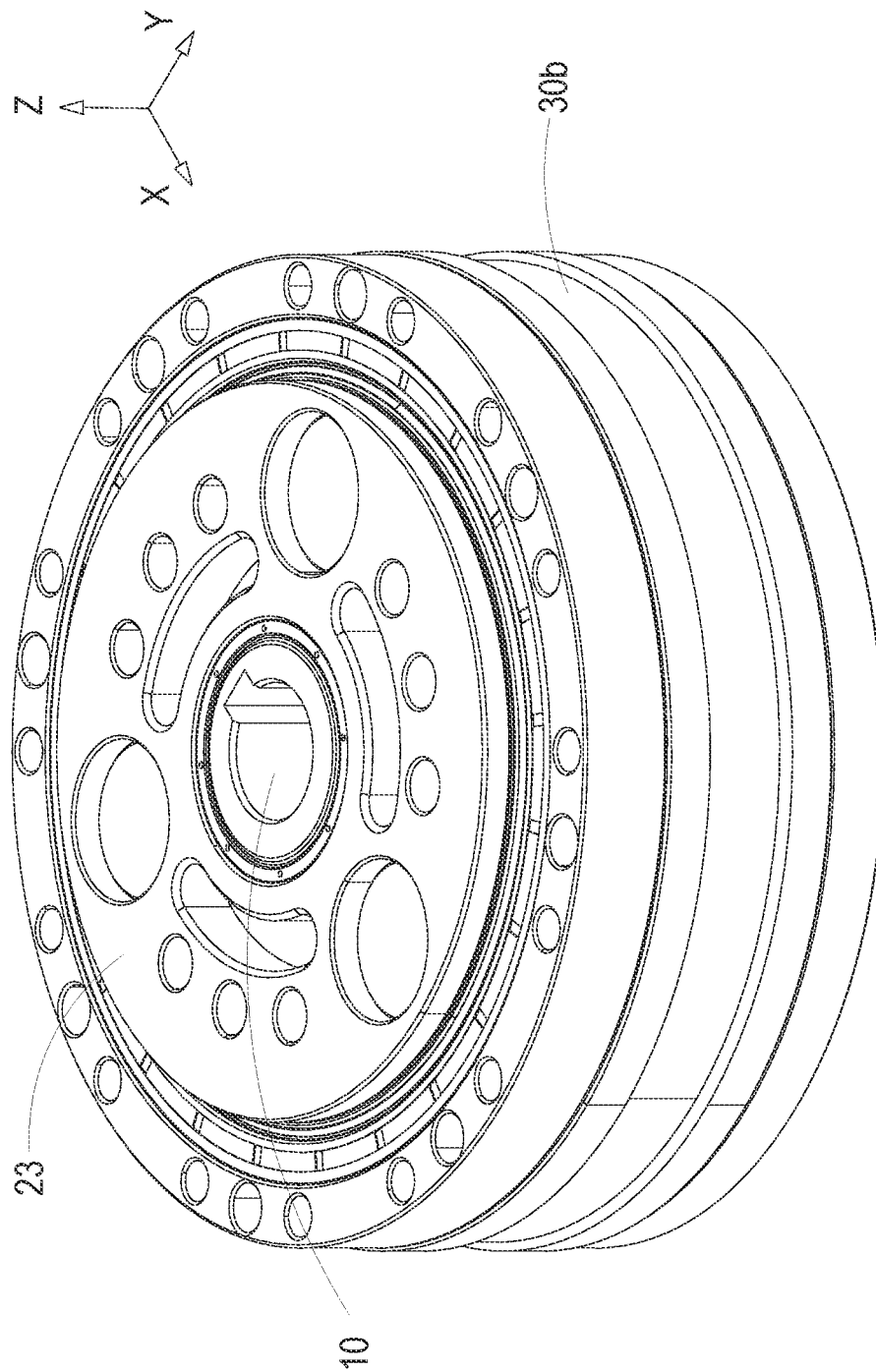
FIG. 19 is a schematic exterior view illustrating a rotary bearing assembly according to a fourth embodiment of the present disclosure.
Figure 20:
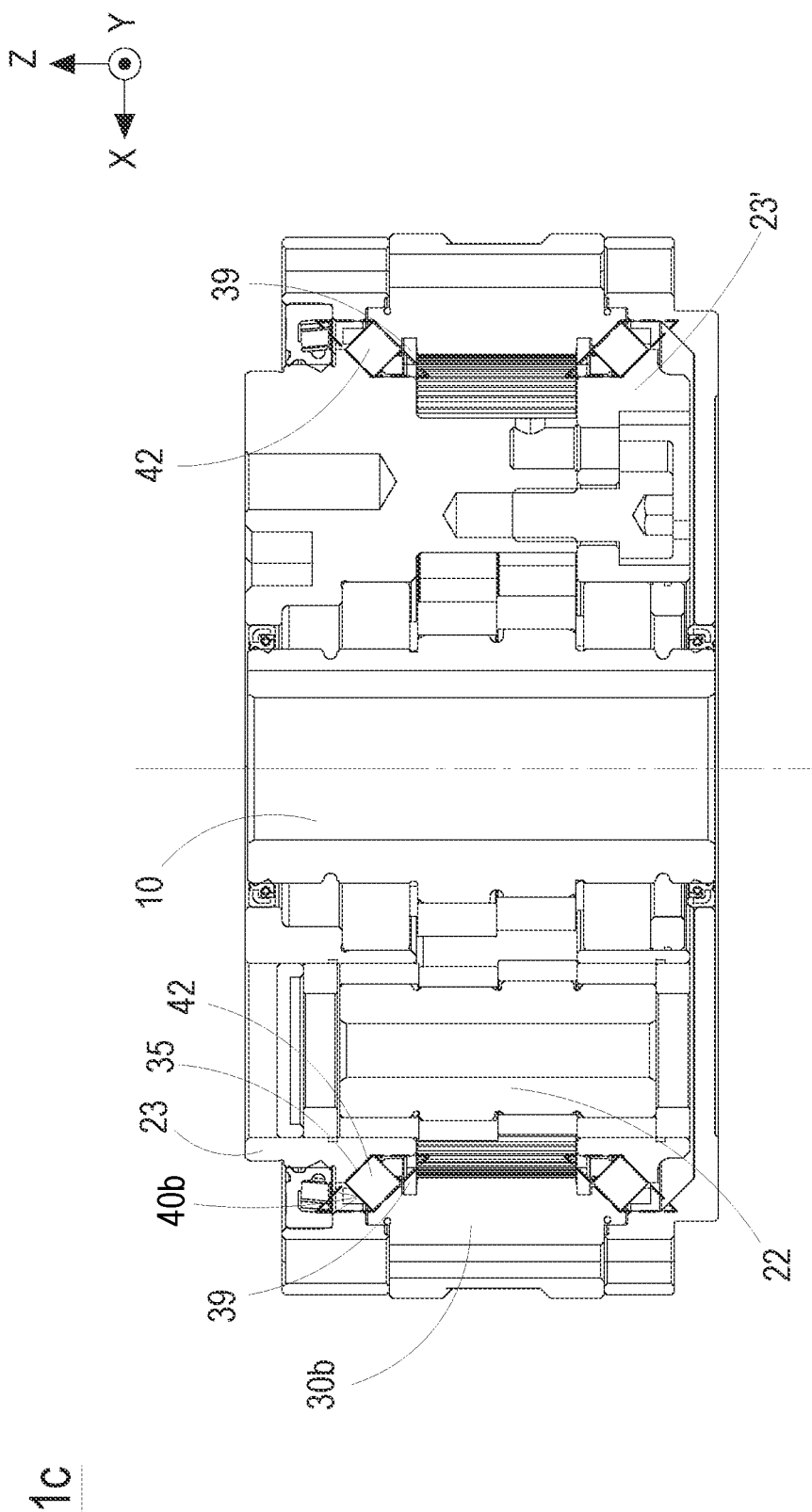
FIG. 20 is a vertically cross-sectional view illustrating the rotary bearing assembly according to the fourth embodiment of the present disclosure.
Figure 21:
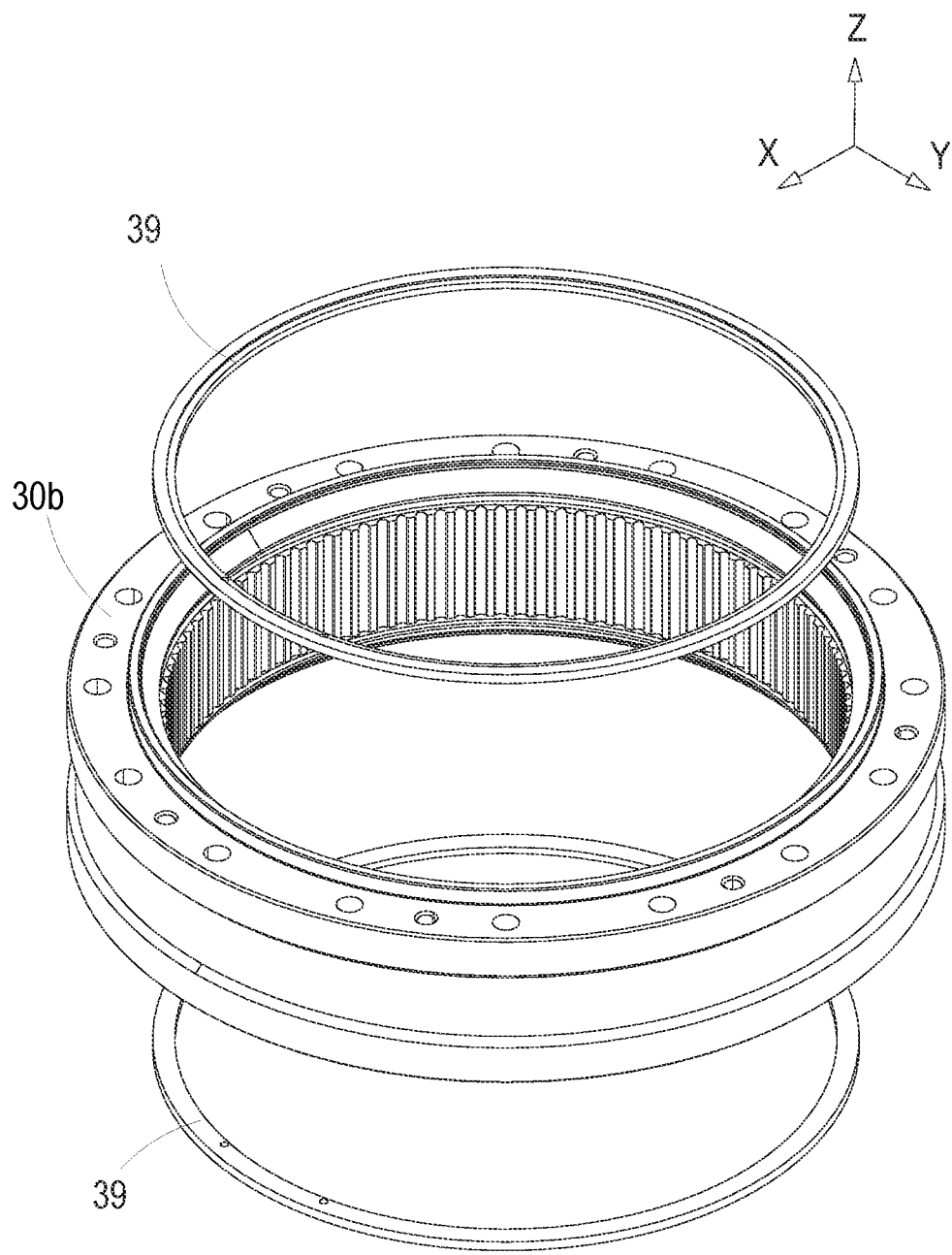
FIG. 21 is a schematic exploded view illustrating the outer-ring component of the rotary bearing assembly according to the fourth embodiment of the present disclosure.
Figure 22:
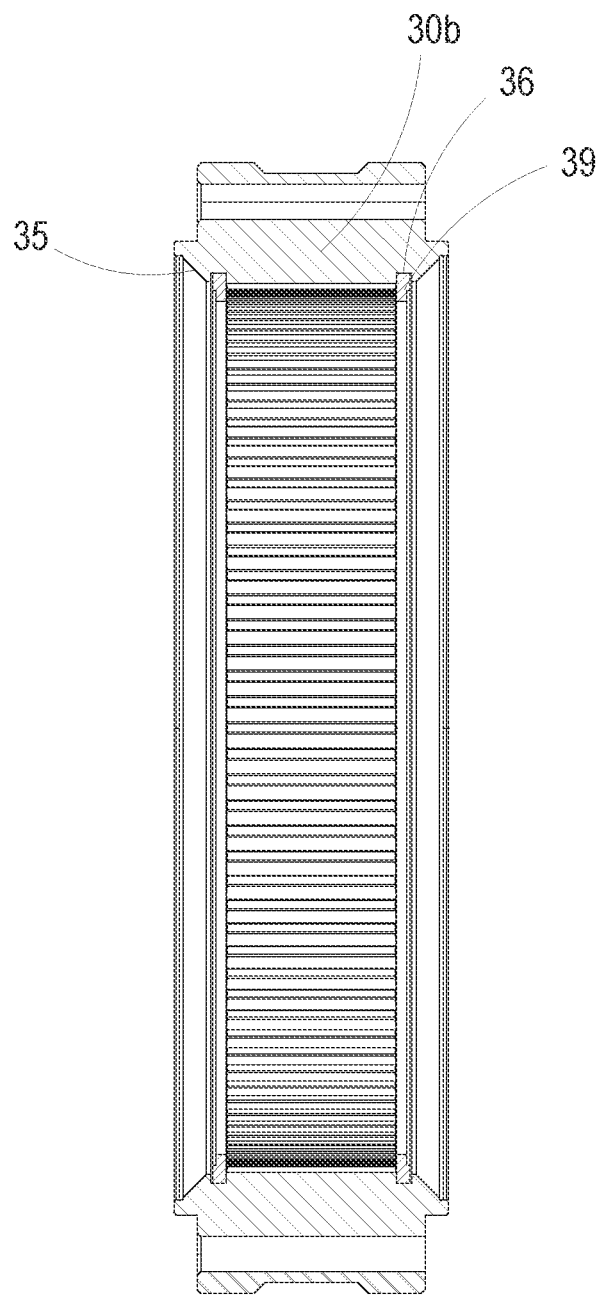
FIG. 22 is a vertically cross-sectional view illustrating the outer-ring component of the rotary bearing assembly according to the fourth embodiment of the present disclosure.

Please refer to FIG. 19 to FIG. 20. A rotary bearing assembly is provided according to a fourth embodiment of the present disclosure. In the embodiment, the structures, elements and functions of the rotary bearing assembly 1c are similar to those of the rotary bearing assembly 1 of FIG. 1 to FIG. 8, and are not redundantly described herein. In the embodiment, the outer-ring component 30b includes a pair of roller retaining rings 39 and a running track 35. The pair roller retaining rings 39 are disposed on the two opposite sides of the outer-ring component 30b through an accommodation slot 36, respectively. The running tracks 35 are located at the two opposite sides of the outer-ring component 30b, and disposed adjacent to the roller retaining rings 39. In the embodiment, the load element 40b includes a plurality of bearing rollers 42, which are configured to run on the running tracks 35.

In summary, the present disclosure provides a rotary bearing assembly for forming an integrated bearing structure with the high load capacity and the high-speed ratio deceleration output, and also having the advantage of small size. With the rotary bearing assembly combined with the reducer, it allows reducing the overall volume and the number of parts under the same load, facilitating to the assembly process, and solving the shortcomings of the conventional cycloidal reducer that are not conducive to miniaturization and cannot share bearing materials. On the other hand, the concentric end and the eccentric end of the transmission shaft used in the rotary bearing assembly have the same diameter. Consequently, it is not necessary to increase the diameter of the eccentric end, and the miniaturization of the cycloid speed reducer can be realized. In addition, since the concentric end and the eccentric end of the transmission shaft have the same diameter, the bearings disposed around the concentric end and the eccentric end of the transmission shaft respectively may be designed to be compatible with the same specification. In this way, the component cost is reduced. Moreover, the concentric end and the eccentric end of the transmission shaft are integrally formed as a one-piece structure. Consequently, the accuracy of the arrangement and alignment of the transmission shaft within the rotary bearing assembly is improved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A rotary bearing assembly comprising:
   an input shaft configured to combine a rotating shaft of a motor to provide a power input;
   an inner-ring component comprising a gear set, wherein the inner-ring component is sleeved on the input shaft through the gear set and driven by the input shaft; and
   an outer-ring component sleeved on the inner-ring component through a load element and engaged with the gear set, wherein when the gear set is driven by the input shaft to drive the inner-ring component, the gear set drives the outer-ring component, and the inner-ring component and the outer-ring component are rotated relatively, wherein one of the inner-ring component and the outer-ring component is served to provide a power output, and a rotational speed difference is between the power input and the power output,
   wherein the load element includes a pair of track rings, the gear set comprises a first cycloid disc, and the first cycloid disc is disposed around the input shaft and driven by the input shaft to rotate,
   wherein the pair of track rings have a track inner diameter, the first cycloid disc has a cycloid-disc outer diameter, and the track inner diameter is greater than the cycloid-disc outer diameter.

2. The rotary bearing assembly according to claim 1, wherein the inner-ring component comprises at least one output disc and a transmission shaft, and the at least one output disc is linked with the gear set through the transmission shaft.

3. The rotary bearing assembly according to claim 2, wherein in case of that the outer-ring component is served as an output end and the inner-ring component is served as a fixed end, the at least one output disc is fixed, the gear set is driven by the input shaft, and the outer-ring component is driven through the gear set to provide the power output, wherein in case of that the outer-ring component is served as a fixed and the inner-ring component is served an output end, the outer-ring component is fixed, the gear set is driven by the input shaft, and the at last one output disc is driven through the transmission shaft by the gear set to provide the power output.

4. The rotary bearing assembly according to claim 2, wherein the outer-ring component comprises a needle-housing ring and a plurality of rolling pins, the plurality of rolling pins are arranged on the needle-housing ring, the load element includes a plurality of bearing rollers, and the pair of track rings are disposed on two opposite sides of the needle-housing ring, so as to provide a running track respectively for the plurality of bearing rollers running thereon.

5. The rotary bearing assembly according to claim 4, wherein the gear set further comprises a second cycloid disc, the first cycloid disc comprises a first tooth part contacted with at least corresponding one of the plurality of rolling pins, the second cycloid disc is disposed around the input shaft and driven by the input shaft to rotate, and the second cycloid disc comprises a second tooth part contacted with at least corresponding another one of the rolling pins, wherein the first cycloid disc and the second cycloid disc are located at two opposite sides of the needle-housing ring.

6. The rotary bearing assembly according to claim 5, wherein the second cycloid disc has the cycloid-disc outer diameter.

7. The rotary bearing assembly according to claim 5, wherein the transmission shaft comprises a first concentric end, a first eccentric end, a second eccentric end and a second concentric end integrally formed as a one-piece structure and arranged sequentially, wherein the first eccentric end is linked with the first cycloid disc, the second eccentric end is linked with the second cycloid disc, an eccentricity value is between any neighboring two of the first concentric end, the first eccentric end, the second eccentric end and the second concentric end, and a diameter of the first concentric end, a diameter of the first eccentric end, a diameter of the second eccentric end and a diameter of the second concentric end are all equal to a transmission-shaft diameter, wherein the at least one output disc is linked with the first concentric end or the second concentric end.

8. The rotary bearing assembly according to claim 7, wherein the eccentricity value between the first concentric end and the first eccentric end is defined as a first eccentricity value, the eccentricity value between the second concentric end and the second eccentric end is defined as a second eccentricity value, the eccentricity value between the first eccentric end and the second eccentric end is defined as a third eccentricity value, the first eccentricity value is equal to the second eccentricity value, and the third eccentricity value is double the first eccentricity value.

9. The rotary bearing assembly according to claim 8, wherein the inner-ring component further comprises a first bearing and a second bearing, each of the first bearing and the second bearing comprises a plurality of output eccentric shaft needles, and double of a diameter of each of the plurality of output eccentric shaft needles is greater than or equal to the first eccentricity value.

10. The rotary bearing assembly according to claim 9, wherein the plurality of output eccentric shaft needles of the first bearing are disposed around an outer ring wall of the first eccentric end, and the plurality of output eccentric shaft needles of the second bearing are disposed around an outer ring wall of the second eccentric end.

11. The rotary bearing assembly according to claim 10, wherein the at least one output disc comprises a first output disc and a second output disc located at two opposite sides of the needle-housing ring, the first output disc comprises an installation hole aligned with the corresponding transmission shaft for allowing the first concentric end of the corresponding transmission shaft to penetrate through, and the second output disc comprises an installation hole aligned with the corresponding transmission shaft for allowing the second concentric end of the corresponding transmission shaft to penetrate through.

12. The rotary bearing assembly according to claim 11, wherein each of the installation holes has an inner diameter equal to a sum of the transmission-shaft diameter and double of a diameter of the plurality of output eccentric shaft needles.

13. The rotary bearing assembly according to claim 9, wherein each adjacent two of the plurality of output eccentric shaft needles are spaced by one corresponding rolling pin retainer, and a gap is formed between each of the plurality of output eccentric shaft needles and the corresponding rolling pin retainer.

14. The rotary bearing assembly according to claim 4, wherein the first cycloid disc comprises a first tooth part contacted with at least corresponding one of the plurality of rolling pins.

15. The rotary bearing assembly according to claim 14, wherein the transmission shaft comprises a first concentric end, a first eccentric end and a second concentric end integrally formed as a one-piece structure and arranged sequentially, wherein the first eccentric end is linked with the first cycloid disc, an eccentricity value is between any neighboring two of the first concentric end, the first eccentric end and the second concentric end, and a diameter of the first concentric end, a diameter of the first eccentric end and a diameter of the second concentric end are all equal to a transmission-shaft diameter, wherein the at least one output disc is linked with the first concentric end or the second concentric end.

16. The rotary bearing assembly according to claim 15, wherein the eccentricity value between the first concentric end and the first eccentric end is defined as a first eccentricity value, the eccentricity value between the second concentric end and the first eccentric end is defined as a second eccentricity value, and the first eccentricity value is equal to the second eccentricity value.

17. A rotary bearing assembly comprising:
an input shaft configured to combine a rotating shaft of a motor to provide a power input;
an inner-ring component comprising a gear set, wherein the inner-ring component is sleeved on the input shaft through the gear set and driven by the input shaft; and
an outer-ring component sleeved on the inner-ring component through a load element and engaged with the gear set, wherein when the gear set is driven by the input shaft to drive the inner-ring component, the gear set drives the outer-ring component, and the inner-ring component and the outer-ring component are rotated relatively, wherein one of the inner-ring component and the outer-ring component is served to provide a power output, and a rotational speed difference is between the power input and the power output,
wherein the inner-ring component comprises at least one output disc and a transmission shaft, and the at least one output disc is linked with the gear set through the transmission shaft,
wherein the load element comprises a plurality of bearing rollers, and the outer-ring component includes an inner gear ring comprising an inner-gear-ring main body, an inner tooth portion and a running track for the plurality of bearing rollers running thereon, and the running track has an inclined angle relative to an axial direction of the input shaft, wherein the gear set of the inner-ring component and the inner tooth portion of the inner gear ring are partially engaged with each other.

18. The rotary bearing assembly according to claim 17, wherein the inner tooth portion is set on an inner-base surface of the inner-gear-ring main body and has a gear-base diameter, the running track is arranged on one lateral side of the inner gear ring has a track inner diameter adjacent to the inner tooth portion, wherein the track inner diameter is greater than or equal to the gear-base diameter.

19. The rotary bearing assembly according to claim 17, wherein the running track is spatially corresponding to the inner-gear-ring main body and the at least one output disc of the inner-ring component, and a parallelogram is collaboratively formed on a radial section so that the plurality of bearing rollers are configured to run between the inner-gear-ring main body and the at least one output disc of the inner-ring component.

* * * * *